United States Patent
Zubieta Andueza

(10) Patent No.: US 11,685,468 B2
(45) Date of Patent: Jun. 27, 2023

(54) CHAIN-RINGS SET FOR A BICYCLE POWER TRANSMISSION SYSTEM PROVIDED WITH SEGMENTED CHAIN-RING AND SEGMENTATION METHOD FOR OBTAINING IT

(71) Applicant: ZUMA INNOVATION, S.L., Galdakao (ES)

(72) Inventor: Mikel Zubieta Andueza, Galdakao (ES)

(73) Assignee: ZUMA INNOVATION, S.L., Galdakao (ES)

( * ) Notice: Subject to any disclaimer, the term of this patent is extended or adjusted under 35 U.S.C. 154(b) by 1241 days.

(21) Appl. No.: 16/306,872

(22) PCT Filed: Jun. 2, 2017

(86) PCT No.: PCT/EP2017/063578
§ 371 (c)(1),
(2) Date: Dec. 3, 2018

(87) PCT Pub. No.: WO2017/207809
PCT Pub. Date: Dec. 7, 2017

(65) Prior Publication Data
US 2021/0031878 A1 Feb. 4, 2021

(30) Foreign Application Priority Data
Jun. 3, 2016 (EP) .................................... 16382253

(51) Int. Cl.
*B62M 9/10* (2006.01)
(52) U.S. Cl.
CPC .................................. *B62M 9/105* (2013.01)

(58) Field of Classification Search
CPC .......... B62M 9/14; B62M 9/08; B62M 9/105; B62M 9/12; B62M 9/10; F16H 55/54; F16H 9/24; F16H 55/30
(Continued)

(56) References Cited

U.S. PATENT DOCUMENTS

| 601,990 A | * | 4/1898 | Suter ........................ F16H 55/54 |
| | | | 74/447 |
| 2,368,147 A | | 1/1945 | Lapeyre |

(Continued)

FOREIGN PATENT DOCUMENTS

| CH | 617992 A5 | 6/1980 |
| EP | 0474139 A1 | 3/1992 |

(Continued)

OTHER PUBLICATIONS

International Preliminary Report on Patentability dated Dec. 4, 2018 re: Application No. PCT/EP2017/063581, pp. 1-7.

(Continued)

*Primary Examiner* — Henry Y Liu
(74) *Attorney, Agent, or Firm* — Cantor Colburn LLP

(57) ABSTRACT

Chain-rings sets for power transmission systems, where at least one of the chain-rings is formed by independent segments provided with axial displacement means, where the segmentation is optimum both for shifts to a bigger chain-ring or a smaller chain-ring through a relative configuration between chain-rings, especially between the teeth involved in the power transmission during the shift, that ensure a smooth shift, efficient in the power transmission and reducing as possible the friction and the wear of the components.

16 Claims, 24 Drawing Sheets

(58) Field of Classification Search
USPC .................................. 474/47, 162, 152, 160
See application file for complete search history.

(56) References Cited

U.S. PATENT DOCUMENTS

| | | | |
|---|---|---|---|
| 2,827,795 | A | 3/1958 | Caballeros |
| 4,055,093 | A | 10/1977 | Ross |
| 4,127,038 | A * | 11/1978 | Browning ................ B62M 9/12 280/236 |
| 4,174,642 | A * | 11/1979 | Martin ................... F16H 55/30 474/152 |
| 4,417,642 | A | 11/1983 | Suzuki et al. |
| 4,580,997 | A * | 4/1986 | Browning ................ B62M 9/14 474/160 |
| 4,592,738 | A * | 6/1986 | Nagano ................... B62M 9/14 474/162 |
| 4,810,235 | A * | 3/1989 | Husted ................... B62M 9/08 474/49 |
| 5,073,152 | A * | 12/1991 | Browning ................ B62M 9/16 474/162 |
| 5,152,720 | A | 10/1992 | Browning et al. |
| 5,205,794 | A * | 4/1993 | Browning ................ B62M 9/14 474/160 |
| 5,354,243 | A * | 10/1994 | Kriek ..................... B62M 9/14 474/135 |
| 5,935,033 | A * | 8/1999 | Tseng ................... B62M 9/105 474/155 |
| 5,970,816 | A | 10/1999 | Savard |
| 6,267,699 | B1 * | 7/2001 | Gruich ................... B62M 9/14 474/49 |
| 6,325,734 | B1 * | 12/2001 | Young .................... F16H 55/30 474/205 |
| 6,431,573 | B1 | 8/2002 | Lerman et al. |
| 6,749,531 | B2 * | 6/2004 | Kang ..................... B62M 9/08 474/47 |
| 7,156,764 | B2 * | 1/2007 | Mercat ................. B62M 25/045 474/47 |
| 7,715,566 | B2 * | 5/2010 | Seo ........................ H04B 1/16 348/731 |
| 7,749,117 | B2 * | 7/2010 | Carrasco Vergara .... B62M 9/08 280/259 |
| 8,092,329 | B2 * | 1/2012 | Wickliffe ................ B62M 9/12 474/160 |
| 8,096,908 | B2 * | 1/2012 | Oishi ..................... B62M 9/10 474/160 |
| 8,753,236 | B2 * | 6/2014 | Wong ..................... F16H 9/24 474/47 |
| 9,499,233 | B2 | 11/2016 | Schuster |
| 10,259,532 | B2 | 4/2019 | Schuster |
| 10,435,112 | B2 * | 10/2019 | Tetsuka .................. B62M 9/16 |
| 2002/0006842 | A1 * | 1/2002 | Tetsuka .................. B62M 9/10 474/160 |
| 2002/0084618 | A1 * | 7/2002 | Lerman ................... B62M 1/36 280/281.1 |
| 2007/0213155 | A1 * | 9/2007 | Reiter .................... B62M 9/10 474/160 |
| 2008/3000096 | | 12/2008 | Wesling et al. |
| 2009/0143179 | A1 * | 6/2009 | Penner ................... F16H 7/06 474/157 |
| 2010/0137086 | A1 * | 6/2010 | Lin ....................... B62M 9/105 474/160 |
| 2013/0267362 | A1 * | 10/2013 | Gheciu ................. B62M 9/105 474/164 |
| 2014/0013900 | A1 * | 1/2014 | Shiraishi .............. B62M 9/105 74/594.2 |
| 2014/0248982 | A1 * | 9/2014 | Schuster ................ B62M 9/06 474/69 |
| 2014/0303859 | A1 * | 10/2014 | Miki ..................... B62K 23/06 701/60 |
| 2016/0101825 | A1 * | 4/2016 | Braedt ................... B62M 9/10 474/160 |
| 2017/0283006 | A1 * | 10/2017 | Schuster ................ F16H 55/54 |
| 2017/0355422 | A1 * | 12/2017 | Sugimoto ............ F16H 55/303 |

FOREIGN PATENT DOCUMENTS

| | | |
|---|---|---|
| EP | 0945335 A1 | 9/1999 |
| EP | 2602176 A1 | 6/2013 |
| GB | 1529166 A | 10/1978 |
| WO | 9804848 A2 | 2/1998 |
| WO | 2012009571 A1 | 1/2012 |
| WO | 2016033623 A1 | 3/2016 |

OTHER PUBLICATIONS

International Preliminary Report on Patentability dated Dec. 4, 2018 re: Application No. PCT/EP2017/063580, pp. 1-7.
International Preliminary Report on Patentability dated Dec. 4, 2018, re: Application No. PCT/EP2017/063578, pp. 1-8.
International Search Report dated Sep. 14, 2017 re: Application No. PCT/EP2017/063580, pp. 1-3.
International Search Report dated Aug. 24, 2017 re: Application No. PCT/EP2017/063581, pp. 1-4.
International Search Report dated Aug. 3, 2017 re: Application No. PCT/EP2017/063578, pp. 1-4.
Written Opinion dated Aug. 24, 2017 re: Application No. PCT/EP2017/063581, pp. 1-6.
Written Opinion dated Sep. 14, 2017 re: Application No. PCT/EP2017/063580, pp. 1-6.
Written Opinion dated Aug. 3, 2017 re: Application No. PCT/EP2017/063578, pp. 1-7.

* cited by examiner

CHAIN-RINGS SET FOR A BICYCLE POWER TRANSMISSION SYSTEM PROVIDED WITH SEGMENTED CHAIN-RING AND SEGMENTATION METHOD FOR OBTAINING IT

TECHNICAL FIELD

The present disclosure mainly belongs to the field of bicycle transmission ensembles, and more specifically to ensembles without any pushing-element in which gear shifts by chain displacement between different chain-rings occur due to the displacement of the segments of one of the chain-rings towards the general plane of an adjacent chain-ring. However, the disclosure can be applied to any other field where smooth and continuous force transmission between different power transmission ratios through a chain is beneficial.

BACKGROUND

Power transmission systems with several transmission ratios obtained by combining through a chain several gears of different size at the transmitting axis (chain-rings) and/or the transmitted axis (sprockets) are mainly used in the bicycle sector. For this reason, the evolution of chain transmission systems of several relations has been mainly linked to solve the particular issues of power transmission in bicycles.

On a bicycle, the force executed by the cyclist on the crank arms is transmitted through a chain-ring to the chain, and the latter transmits the force to the rear wheel through a sprocket. Bicycles usually have several chain-rings and sprockets of different sizes, so that by combining different ones with the chain, multiple transmission ratios can be obtained and depending on these the rear wheel rotates at different speeds for a given rotational speed at the cranks. Pedalling is more comfortable and efficient at a certain cadence (rotational speed of the cranks), and having several chain-rings and sprockets allows, for example, using a small chain-ring and large sprocket combination when moving uphill in order to gear down the speed and to multiply the exerted force, and using a large chain-ring and small sprocket when moving downhill in order to multiply the rotational speed while decreasing the exerted force.

For a greater versatility of the bicycle, it is interesting to have a range of gear ratios as large as possible, as for efficiency and comfort care it is interesting to have small jumps between different gear ratios, so that it is possible to always have a transmission ratio in which the user can be pedalling close to the optimal or the most preferred cadence. Hence the interest of having the largest number of possible transmission ratios in a bicycle.

In the prior art, the chain displacement from one chain-ring (or sprocket) to another in order to engage a different transmission ratio is realized by derailleurs, which are basically pushing elements that can be controlled by one or several controls. The chain displacement from one chain-ring to a larger one can be broken down into different stages:

I. The shift starts with the derailleur pressing on the side of the chain which "twists" the chain laterally towards the largest chain-ring. This "twisting" starts from the point where the tensioned chain leaves contact with the teeth of the smaller chain-ring, up to the point where the chain gets in contact with a tooth of the largest chain-ring.

II. The cranks rotate while the chain is simultaneously in contact with both chain-rings according to the previous position and while the derailleur keeps pressing on the chain, until the rotation is sufficient to allow contact between the tensioned chain and a second tooth in the larger chain-ring in a position closer to the engaging position due to being pushed by the derailleur.

III. As the chain-rings rotate, the chain gets in contact with different teeth on the larger chain-ring while the derailleur keeps pressing on the chain. At some stage the chain laterally surpasses the teeth of the larger chain-ring and progressively accommodates in the valleys of each tooth (because the step between teeth is greater at the tips than in the valleys due to the largest radius for the same angle). Eventually one of the chain rollers gets to an engaging position relative to one of the teeth of the larger chain-ring in which it is able to effectively transmit force. In this moment it is considered that the shifting process has ended.

This sequence is illustrated for example in FIGS. 5A to 5F in document EP-0945335-A1. In FIG. 5A the chain is engaged in the small chain-ring. Then FIG. 5B is the result from stage I of shifting, where shifting starts as the chain gets in contact with the larger chain-ring (at point 22) due to the lateral displacement of the chain.

Stage II of shifting occurs between FIGS. 5B and 5C, where the power applied on the cranks is transmitted simultaneously through both chain-rings. This is a critical stage in the shifting process because the support of the chain must be firm enough to transmit the pedalling power. Otherwise the chain would slip and fall towards the smaller chain-ring and the whole shifting process should be re-started. In order to improve the ability to transmit power in this condition, the larger chain-ring can have pins or ramps such as the ones described in U.S. Pat. No. 8,092,329-B2, or as the pin number 22 in the aforementioned figures from EP-0945335-A1. These ramps or pins define hooking points for the chain, so that when it is displaced during rotation, they help fixing the corresponding chain section on the surface of the larger chain-ring oriented towards the smaller chain-ring.

Stage III of shifting occurs approximately between FIGS. 5C and 5D in EP-0945335-A1. In this stage, initially, the contact with the teeth is performed with the external part of the chain until the chain surpasses the height of the teeth and starts to settle on one tooth so that contact is made with the inside part of the chain. The teeth on the larger chain-ring can be lowered to facilitate the chain's lateral surpassing in this stage, such as in the system described in EP-0945335-A1, in which teeth lowering is maximum. Once the chain is in the plane of the larger chain-ring, the settlement of the chain in the tooth valley (and therefore in a position of engagement) depends on the initial tooth contact point.

In shifting systems such as the one described in EP-0945335-A1, where specific shift times are defined, it is possible to synchronize the two chain-rings so that the point of contact with the larger chain-ring is optimal in order to minimize the chain settlement time in stage III.

This synchronization between chain-rings is not only important for stage III. In the disclosure described in EP-0945335-A1, defining a specific "path" for "rising" the chain to the larger chain-ring also allows lowering the teeth of the smaller chain-ring (area M) in order to ease stage I, and accurately position pin 22 in order to optimize stage II, so that a highly optimized chain-ring profile is obtained for upward shifting. This makes possible the fact of avoiding any chain-pushing element and to perform the shifting solely due to the side displacement of the chain that occurs when the smaller sprockets are engaged.

It can be considered that the shifting is already over by the time in which the configuration in FIG. 5D is achieved, where the chain engages appropriately with the sprockets and therefore the power transmission between chain-ring teeth and chain is performed optimally. Still, the chain is not fully settled in the larger chain-ring until reaching the position in FIG. 5F. In this position, when the chain is fully settled in the larger chain-ring (as well as when it is fully settled on the smaller chain-ring) the main limitations of disclosure EP-0945335-A1 show up; due to the large reductions on the teeth profile, it is possible that power transmission is not appropriate at those points and even chain slippage out of the chain-ring can occur due to external vibrations. Therefore, it is preferable to maintain a more complete teeth profile as it is shown in disclosure U.S. Pat. No. 8,092,329-B2, even if this implies more contact and friction during the shifting process, thus becoming essential the use of a derailleur or chain-pushing element that can exert a high force for the shifting to take place, resulting in a process more abrupt and less reliable shifting process.

The shifting process from a larger chain-ring to a smaller one can also be broken down into 3 stages (analogous to the shifting from smaller chain-ring to a larger one):

I. Shifting starts with the derailleur pressing on the side of the chain against the teeth of the smaller chain-ring, so that the chain eventually rises above these teeth and laterally surpasses them, thus disengaging from the larger chain-ring and breaking proper power transmission.

II. The cranks rotate while the chain is pushed towards the smaller chain-ring by the derailleur until the tensioned chain gets in to the plane of the smaller chain-ring and makes contact with one tooth on the smaller chain-ring. Throughout this stage, power is transmitted by the last tooth properly engaging the chain on the larger chain-ring.

III. While the derailleur maintains the chain in the plane of the lower chain-ring, the rotation of chain-rings makes the chain to get in contact with different teeth of the smaller chain-ring so that it progressively settles better on the valleys of each tooth (because the step between teeth is greater at the tips than in the valleys due to the largest radius for the same angle), until reaching an appropriate engaging position with one of the teeth in the smaller chain-ring, in which power transmission between chain-ring and chain is efficient, and thus it is considered that the shifting process has ended.

EP-0945335-A1 describes how down-shifting is also performed without any chain-pushing element, just based on the side displacement of the chain that occurs when the larger sprockets are engaged and due to a specific profile of the chain-rings. In FIG. 4B of such document, the shifting process at the end of stage II of a shift towards a smaller chain-ring can be observed. This figure shows that the teeth of the larger chain-ring reduced in region N, which facilitates stage I as much as possible. Also, it shows that the contact with the teeth of the smaller chain-ring is not performed optimally, synchronization is not good, and so it requires a longer stage III for the chain to settle on the smaller chain-ring as compared to a shifting towards a larger chain-ring. This document highlights the difficulty to synchronize chain-rings for an optimum chain "rise" while also having them synchronized for an optimum chain "descent". In general, in is not possible to synchronize both processes (chain "rise" and "descent"), and usually the chain "rise" process is prioritized.

The teeth reductions in region N shown in EP-0945335-A1 highlight their instability problems against vibrations when transmitting power with the larger chain-ring. In US-2014/0013900-A1 smaller reductions are shown in order to ease the lateral surpassing of the teeth by the chain while keeping a large enough teeth size for stability against vibrations. The disadvantage of these larger teeth is that, once again, they require the use of a derailleur or a chain-pushing element, which implies a more abrupt and less reliable shifting process. Also, it should be noted that in US-2014/0013900-A1 multiple shifting points to shift to a smaller chain-ring are shown without any guarantee of synchronization with the smaller chain-ring, so that stage III of settlement in the shift to a smaller chain-ring is long and not optimal.

Due to the chain's lack of stability during power transmission and not being able to shift chain-rings "at will" (since it is necessary to move the rear derailleur to certain sprockets in order to trigger the shifting), the disclosure described in EP-0945335-A1 did not get any market acceptance. However, shifting systems such as those described in U.S. Pat. No. 8,092,329-B2 and US-2014/0013900-A1 are widely used, and in fact almost exclusively, despite their obvious limitations. In these systems it is necessary to exert great force with the derailleur or pushing-element on the tensioned chain in order to surpass the teeth laterally and allow the chain to settle in a different chain-ring. During this process high friction occurs between the chain and the chain-rings which implies a waste of energy, accelerates wear of transmission elements and may even lead to earlier transmission breakage. During the shifting process, power transmission is also highly affected due to the large time intervals in which the chain is not properly supported by the force transmitting tooth, which not only enhances wear and increases the possibilities of breakage of these elements, but can also cause loss of contact between chain and tooth. Because of this the chain can jump, thus invalidating the shifting or even generating the chain to come off any chain-ring, which ends up preventing power transmission. To limit these jumps and ensure more reliable shifting, disclosures U.S. Pat. No. 8,092,329-B2 and US-2014/0013900-A1 propose certain "paths" for upshifting and for downshifting. However, if the shifting is executed at another point (out of these "paths") or the chain is held with friction until reaching these optimal shift points, or shifting starts in a non-optimal point, there is a high risk of ending up in a failed shifting operation.

This problem with chain-ring shifting is even more significant with non-round chain-rings (e.g. oval-shaped chain-rings), where the distance between the chain-ring teeth and the pushing-element (derailleur) is variable so the efficiency of the actuator decreases. For example, as described in FIG. 3 of U.S. Pat. No. 7,749,117-B2, ovoid chain-rings (and any other non-round chain-ring) can be considered a chain-based power transmission system with variable transmission ratio. The power transmission ratio varies along the pedalling cycle to suit the non-uniform power input (user's pedalling) in order to achieve a more uniform force transmission to the chain. In these systems, by controlling the relative arrangement of the teeth, a proper engagement of the chain with all teeth is achieved, so that the smoothness and effectiveness during power transmission is equivalent to that in round-shaped chain-rings. In this sense the operation with non-round chain-rings can be considered the behaviour benchmark for variable/shifting transmission ratio systems. The limitation of these systems is that the transmission ratio shifting occurs during the pedalling cycle and it is not controllable by the user. Therefore, in order to have different gear ratios in different pedalling cycles, it is necessary to have additional chain-rings (round or not), and perform the shifting to such chain-rings (usually with a derailleur, which is even less efficient with this kind of chain-rings).

In the other hand, sprocket shifting, either upshift or downshift, it is done in a very similar way to the chain-ring shifting, but there is an important difference that completely changes the result: sprocket shifting occurs when the chain has no tension, so that the teeth can be easily surpassed laterally with little force and undesired chain jumps are reduced. As in the case of chain-rings, shifting starts from the moment the chain touches the sprocket, but unlike with chain-rings, the chain has no tension at this point and shifting takes place smoothly so that the chain is fully settled by the time it has to transmit power to sprocket tooth in which it is engaged.

In U.S. Pat. No. 8,096,908-B2 some modifications are described for the sprocket teeth in order to smooth out the shifting process: some teeth reductions are indicated for the smaller sprocket to ease the way out of the chain due to the interference between chain and sprocket, as well as additional teeth reductions on the larger sprocket to facilitate the entry of the chain and reduce the settlement phase.

Due to this lower efficiency of the front derailleur regarding the rear derailleur, it is more complicated and less reliable to perform a chain-ring shifting than a sprocket shifting. Therefore, currently shifting strategies that minimize the use of the front derailleur are being used. According to these strategies, the whole range of transmission ratios can be covered with a single chain-ring shift. For example, with two chain-rings of 36 and 52 teeth respectively, and 11 sprockets from 11 to 32 teeth, 22 relationships are obtained, out of which only 13 or 14 are usable in the continuous transition from the lowest transmission ratio to the highest transmission ratio, with contiguous transmission ratio "jumps" between 4% and 15.6% as shown in FIG. 1. The critical point in this shifting strategy is the chain-ring shift which involves a simultaneous shift of 2 or 3 sprockets in order to maintain a reasonable "jump" between transmission ratios, so it is a complex, slow and prone to failure operation. There are different situations in which this chain-ring shift can be made (9 alternatives in the transmission in FIG. 1), so it is up to the user to choose the right time for it. The idea would be to perform this potentially annoying shifting at a time that affects the rider's activity the least.

In order to limit the problems of sequencing chain-ring shifting with sprocket shifting in the case of less experienced riders, U.S. Pat. No. 5,970,816-A describes a system with a single controller which can control both derailleurs (front and rear) sequentially according to the sequence estimated to be optimal. With electronic shifters such as those in US-2014/0303859-A1 it is also possible to configure the electronic control unit to follow a certain sequence between transmission ratios as a response to simple commands provided with the shifter controller.

U.S. Pat. No. 4,055,093-A also describes a control switch that governs both derailleurs simultaneously, but in this case following a strategy known as "half-step", in which a chain-ring shift occurs at any shift in the transmission relation. For such purpose the proportional size difference between the chain-rings in this disclosure is about half the size difference between successive sprockets, so that with a chain-ring shift a transmission relation that is in between two successive sprockets is obtained, and the number of effective gear ratios is twice the number of sprockets. This shifting strategy presents a better staggering of gear ratios and a simpler and clearer shifting logic, however it requires using the chain-ring shifter at each gear change, which is a great limitation due to the chain-ring shifters available nowadays.

The operation of front derailleurs is a clear limitation of current transmissions, thus the interest of avoiding it in power transmission systems. However, it should be noted that the derailleur has an additional function apart from shifting chain-rings, as it also serves for guiding the chain while running on the selected chain-ring, reducing the risk of chain slippage out of the chain-rings due to vibrations or other external forces. Therefore, if the front derailleur is removed, a chain guide should be added for the chain-ring or means for preventing the chain getting out of the chain-ring's teeth profile should be considered as described in EP-2602176-A1. One of the primary means used in this disclosure to provide greater stability to the chain while seating on the plate is to adjust the width of the teeth to the internal width of the links, thereby increasing contact between the two, similar to what is described in U.S. Pat. No. 4,174,642-A. Another way to achieve greater stability of the chain on the chain-ring is described in EP-2602176-A1 and consists of a specific teeth profile which considers the support of the chain rollers at different points during the pedalling cycle pedalling: as it is shown in FIG. 16 U.S. Pat. No. 6,325,734-B1, the point of contact between the roller and the chain-ring is changing throughout the cycle. Considering this aspect, U.S. Pat. No. 6,325,734-B1 presents an optimized teeth profile for a force transmission as constant as possible so that a smoother and more silent transmission is achieved. However, the goal of the tooth profile presented in EP-2602176-A1 is to maximize the chain retention. In FIG. 5 of EP-2602176-A1 the interval 74 is delimited in the front flank, wherein the roller engagement on the tooth occurs, and in which optimum power transmission is ensured. Above interval 74 is interval 76 whose aim is to better guide as the rear flank of tooth 70 does. This solution for avoiding the front derailleur has great acceptance in the market, however the number of gear ratios is limited to the number of sprockets.

In order to solve this problem a large number of alternative solutions to perform the chain-ring (or sprocket) shifting have been proposed, for example, EP-0945335-A1, U.S. Pat. Nos. 7,712,566, 5,354,243-A, 5,152,720 A, 4,810,235, 7,156,764 B2, CH-617 992-A5 or US-2014/0248982-A1. Among all, those with the highest relation to the present disclosure proposal are highlighted next, which in turn can be also considered to present a better solution and implementation in the state-of-the-art.

U.S. Pat. No. 5,354,243-A describes a system that does not include a traditional rear derailleur. The sprocket shifting is performed by guiding the chain with the sprockets themselves. It consists of a flexible package of equidistant sprockets with a radial cut. In its default position the sprockets are multiple disk planes defined in space. However, it is possible to deform laterally the sprockets in either direction so that the end of each sprocket is aligned with the end of the next sprocket, forming a spiral on which the chain can move to change the plane, in either sense. Shifting is made completely eliminating stage I of shifting (the output goes directly to the next sprocket without the chain having to overcome the sprocket tooth), the entrance to another sprocket is also straightforward which slightly improves stage II. However, this system requires the chain to be rolling in stage III of settlement, since synchronization between different gears is not optimal. The main limitation of this disclosure is that, due to the flexibility of the sprockets, rigidity and strength problems arise in the power transmission. The disclosure U.S. Pat. No. 5,152,720 A solves this problem by rigid sprockets with an articulated 90-degree section that operates in the same way as the prior disclosure and is valid for changing sprockets as well as for shifting chain-rings, but stage III of shifting is not optimal yet.

CH-617992-A5 discloses a solution similar to U.S. Pat. No. 5,354,243-A with flexible sprockets/chain-rings, but in this case they behave differently. Instead of forming a spiral to move the chain, the new sprocket/chain-ring is formed in the same plane of the previous one so that the chain does not change plane. That is, the plane of the chain transmission is always the same. In CH-617 992-A5 several configurations are also presented in which the chain-rings are divided into several rigid segments that enter the smaller chain-ring's plane while passing through the chain-free zone create a large chain-ring, or that alternatively exit the plane to leave the chain engaged on the smaller chain-ring. A linear displacement parallel to the axial direction of chain-rings, or an angular displacement resulting in the same direction at the end of its route is considered.

All configurations presented in CH-617992-A5 have a similar process to the one provided in U.S. Pat. No. 5,354,243-A, where stage I has been removed and stage II has been minimized, but also the synchronization between chain-rings is not optimal, and requires a prolonged stage III for settlement, as shown in FIGS. 4B and 5B and in spite of the lowering on teeth 5 and 5a. In these teeth the front flank of the tooth has been lowered so that the chain from the other chain-ring can make contact with the new chain-ring on this flank. But because of the displaced flank, the power transmission from tooth to chain is far from being perpendicular to the chain-ring radius at that point, so it is not performed effectively. In addition, it compromises the support of the chain in the next tooth, unless this is also lowered, which delays the settlement of the chain in the teeth (stage III) and the time when the chain is engaged at an appropriate tooth-point for effective force transmission. And it is possible that, when the chain settles in a position of engagement in a tooth, chain resettlement occurs in previous teeth as illustrated in FIGS. 4C and 5C because the previous supports were not firm enough. This can generate wear and noise due to a large folding between links in chain-ring shifting zone which can cause additional problems when the chain has to leave the chain-rings.

Consider also that teeth 5 and 5a are lowered from the valley along the entire front flank, so that the recess also affects the range of engagement of the chain with the tooth, preventing proper power transmission by those teeth in both the smaller and the larger chain-rings after the shifting process.

These problems in the settlement and power transmission come from a non-optimal angular synchronization between chain-rings because all segments should form a continuous solution when put together. This has the advantage that chain-ring shifting can be initiated with any segment, but restricts the relative position between the teeth involved in both shifting processes (upwards and downwards) limiting the possibilities of synchronization. With these restrictions, in all the preferred solutions all segments have the same shape as illustrated.

Another limitation of the device presented in CH-617,992-A5 is that the segments have to travel to the same plane of the previous chain-ring, keeping the same working plane, so the allowable size difference between successive chain-rings depends on the tooth height. In this respect the limit is in the 4 teeth difference between chain-rings as illustrated in FIG. 6. However, this embodiment is not recommended because on the one hand the teeth support seems very weak as illustrated in FIG. 7 and on the other hand the height of the teeth is also somewhat low which can present problems in retaining the chain in the presence of vibrations or other external forces, especially considering that the disclosure does not include any measure to improve the stability of the chain on the chain-ring in the absence of a derailleur. In order to implement this disclosure, it would be advisable to have a difference between successive chain-rings of at least 5 or 6 teeth.

In addition to structural problems when the size difference between chain-rings is low, the system presented in CH-617,992-A5 has additional structural limitations regarding the guiding of the segments and their force transmission capacity, as well as regarding the segment actuators as described in US-2014/0248982-A1. To this end US-2014/0248982-A1 proposes a chain-ring shifting concept similar to CH-617992-A5, but in which a novel solution for guiding and driving is proposed to solve the problems of guiding and driving. However, it provides neither a solution to the limitation of synchronization of segments and chain-rings (extended stage III of shifting) nor a structural solution to use chain-rings with four teeth or less difference with guarantee.

On the other hand, WO2016033623A1 disclosure is based on the US-2014/0248982-A1 but it adds the electronic control of the displacement of the segments, and the disclosure US20020084618 which is an automatic chain-ring shifter based on segments with a shifting mechanism very similar to that described in CH-617 992-A5 and 2014/0248982-A1 patents, and therefore with the same limitations.

BRIEF SUMMARY

In order to overcome the mentioned drawbacks, the present disclosure proposes a chain-rings set for a power transmission system, the set comprising a chain, a first chain-ring, a second chain-ring having a common axis with the first chain-ring and more teeth than the first chain-ring, the teeth comprising a front flank which is the flank that pushes the links of the chain, wherein the second chain-ring is formed by at least two segments, which comprises axial displacement means of the segments such that they can be moved in an independent manner at least in the direction of the common axis, wherein the second chain-ring is segmented in at least:

An up-shift segment for chain shifting from the first chain-ring to the second chain-ring;

A down-shift segment for chain shifting from the second chain-ring to the first chain-ring;

Wherein the up-shift segment is angularly arranged with respect to the first chain-ring in such a way that, in a starting configuration for shifting from the first chain-ring to the second chain-ring and in tensed chain conditions in an up-shift section of the chain between both, the last section of chain being tensed between a last tooth of the first chain-ring and a first tooth of the up-shift segment, a front flank for pushing rollers of the chain being defined in the engaged teeth:

The last engaged tooth of the first chain-ring, is engaged in the up-shift section, with an engaged chain-link of the up-shift section, such that the front flank of the last tooth of the first chain-ring contacts an engaged roller of the engaged chain-link of the up-shift section; and The first engaged tooth of the up-shift segment, is engaged in the up-shift section, with an engagement chain-link of the up-shift section, such that the front flank of the first tooth of the up-shift segment contacts an engagement roller of the engagement chain-link of the up-shift section;

Wherein the down-shift segment is angularly arranged with respect to the first chain-ring such that, in a starting configuration for shifting from the second chain-ring to the first chain-ring and in conditions of tensed chain in a chain down-shift section between both, which is the chain section that is tensed between a last tooth of the down-shift segment and a first tooth of the first chain-ring, a front flank for pushing rollers of the chain being defined in the engaged teeth:

The last engaged tooth of the down-shift segment, is engaged in the down-shift section, with an engaged chain-link of the down-shift section, such that a front flank of the last tooth of the down-shift segment contacts an engaged roller of the engaged chain-link of the down-shift section; and The first engagement tooth of the first chain-ring, is engaged in the down-shift section, with an engagement chain-link of the down-shift section, such that a front flank of the first tooth of the first chain-ring contacts an engagement roller of the engagement chain-link of the down-shift section.

The chain-rings of a transmission set have a common axis, and an angular displacement or offset should be understood as a relative angular position such that it allows reaching the aims of the present disclosure.

The proposed disclosure defines, with respect to the state of the art, a segmentation wherein differentiated up-shift and down-shift segments are defined, with up-shift segments ensuring an optimum engagement in the shift from the small chain-ring to the big one, and with down-shift segments ensuring an optimum engagement in the shift from the big chain-ring to the small chain-ring, thus efficiently transmitting the power without interruption in both cases.

The engagement of a chain-link with a tooth of the chain-ring is defined when the roller of the link (the first roller of the two of the chain link which contacts the chain-ring teeth, the other one being the roller of the link that comes after) contacts the front flank of the tooth, when this front flank has a normal direction approximately parallel to the chain, such that the pressure of the roller on the tooth is carried out approximately in a tangential manner with respect to the chain-ring, this being the most efficient way of transmitting the force between the chain-ring and the chain. In the configurations not-for shifting and in a normal transmission conditions either in the big or the small chain-ring the last tooth of the chain-ring is engaged with the chain in a determined point, whereas the engagement in the previous tooth which previously was carried out at the same height is carried out in a point of the front flank closer to the valley, since the pitch of the chain is usually greater than the pitch of the chain-ring (especially when these elements have some wear). Due to this behaviour, the engagement of the chain with the tooth is produced in an engagement interval which is a part of the front flank. When the contact exits the front flank, the optimum power transmission conditions are no longer met and therefore the chain is no more engaged in that tooth and is simply seated. In this way the chain is only engaged in a few teeth during the forces transmission, in spite of being seated in most of the teeth.

In the configuration for shifting from small chain-ring to big chain-ring, the small chain-ring is transmitting the force through a last tooth to a roller of the chain which leans on the front flank in a position close to the valley thereof. Thanks to the transmitted force the chain is tensed. In this condition it is preferable that the contact of the chain roller in the big chain-ring occurs in the front flank of the first tooth of the up-shift segment, such that the big chain-ring can transmit efficiently the force to the chain from the initial contact to ensure a smooth, precise and reliable shifting. In the same way, in the shifting configuration from the big chain-ring to the small one, the big chain-ring is transmitting force with a last tooth to a roller of the chain which leans on the front flank in a position close to the valley thereof. Thanks to the transmitted force the chain is tensed. In this condition it is preferable that the contact of the roller of the chain in the small chain-ring occurs in the front flank of the first tooth of the small chain-ring, such that the small chain-ring can transmit efficiently the force to the chain from the initial contact to ensure a smooth, precise and reliable shifting. The proposed disclosure proposes a specific segmentation of the big chain-ring to fulfil both conditions simultaneously for the first time.

It is very important that the first contact of the chain with the new chain-ring is carried out in a front flank wherein are maintained the same properties of forces transmission than in the engagement interval, because on one hand it ensures the same force transmission capacity, and on the other hand the seating stage subsequent of the chain in the valley between tooth is accelerated, and therefore the phase III of the shift is reduced, such that faster shifts are obtained. Although the forces transmission is efficient in any contact position with the front flank, the preferred one is when the roller leans as closest possible in the valley since it is the position which offers more stability when faced to the vibrations or other external forces that may disengage the chain.

Thanks to the chain-rings segmentation conditions applied, which result in segments with differentiated functions in contrast with the known prior art, the displacement control processes of the segments known in the art cannot be applied to the proposed disclosure, since it is useless to displace the available first segment to initiate a shifting process, but the shift has to be postponed until the appropriate segment (up-shift segment or down-shift segment) for this shifting process is in conditions to be displaced, which in turn implies a segments position control system.

The set may include the following optional features that can be combined whenever technically possible.

In some embodiments, the down-shift segmentation cut prolongs the rear flank of the last tooth of the down-shift segment such that it does not interfere with the roller subsequent to the engaged roller of the down-shift section in the position for shifting from the second chain-ring to the first chain-ring.

As it is known, the teeth have a front flank, which in the chain-ring teeth are those that pull the chain, and opposite to this front flank, a rear or subsequent flank. Obviously, in the case of the rear sprockets, it is the flank subsequent which is subjected to the forces.

By down-shift segmentation cut that prolongs the rear flank it is meant that this tooth won't have a subsequent valley, and then the chain, or the roller found there, won't find obstacles, and will be correctly tensed between chain-rings.

This roller is the subsequent to the engaged roller, that is, it does not receive a force from the tooth of the down-shift segment, but it is found in the tensed chain section.

This segmentation cut prevents from creating a non-optimal supporting point of the chain in the down-shift segment subsequent to the last tooth of this segment such that the force transmission is carried out always in optimum conditions. In the case that the cut is carried out in another point, the roller would lean on that subsequent valley to the last engaged tooth, and therefore the roller to be considered in the shift would be this one and not the previous one. The problem in this case is that this roller could not transmit the power for not having an appropriate support in a tooth. In such a way, the power transmission during the shift could be somehow reduced, even if it is an acceptable solution. A third option is that the cut is done such that (for example, a straight cut tangent to the subsequent edge of the tooth) it does not allow a free articulation with respect to the previous roller, but wherein the supporting zone of the roller is lower than the supporting zone of the valley. This case is similar to the previous case regarding the operation and therefore it would be an acceptable solution, but with a lessened power transmission, only that due to the lower support of the roller it alters the contact with the tooth of the first chain-ring. Therefore, this could be a strategy that could be used for improving the shifting process thus reducing the seating phase III, in segmentations wherein the shift is not optimally carried out.

A possibility is that the rest of the segmentation cuts are carried out in a similar way even when they do not intervene in the shifting process to a smaller chain-ring. This would have the further advantage that the subsequent tooth would have a wide support surface in the previous valley for a better seating of the corresponding roller.

In some embodiments, the front flanks of the teeth prior to the first engagement tooth of the first chain-ring are cut down above the engagement interval of the flank, wherein the force transmission between the chain-ring and the chain is produced in the non-shifting position, so as not to interfere with the rollers of the chain down-shift section subsequent in the engagement with the chain-ring to the engaged roller of the down-shift section and prior in the engagement with the chain-ring to the engagement roller of the down-shift section in the position for shifting from the second chain-ring to the first chain-ring.

By engagement interval in the non-shifting position it is meant that surface of the front flank of the tooth which contacts the roller and which transmit the forces between the chain-ring and the chain. That is, that area of the tooth is not cut, but it is the area placed above this latter which is cut, so as not to interfere with the chain in its tensed section. Again, what has to be ensured is that the tensed chain section is free of interferences, because otherwise it would not be tensed between the tangency points between chain-rings, but there would be an undesired intermediate interference point.

These cuts prevent from creating a non-optimal supporting point of the chain between the last tooth of the down-shift segment and the first tooth of the first chain-ring such that the force transmission is always carried out in optimum conditions. Since the cut is carried out above the engagement interval, this cut does not affect to the power transmission of the small chain-ring during the non-shifting configuration, and can only slightly affect with regards to the retention of the chain in this point.

In some embodiments the last tooth of the down-shift segment and/or some of the teeth prior to the first tooth of the up-shift segment have a recess in the rear flank so as not to interfere with the rollers of the chain in the moment of unseating of the chain of the chain-ring in any shift position.

The higher engagement of the chain in the front flank of a new chain-ring with respect to the contact in the engagement interval that it would have in the case of remaining engaged in the same chain-ring, implies that this roller will experiment a more significant displacement towards the valley between tooth during the pedalling cycle, such that the previous rollers are also more displaced towards the rear flank of the previous tooth, thus allowing in same cases to define a contact that may difficult the unseating of the chain at the end of the cycle. To avoid this effect it is possible to slightly cut down the rear flank of these teeth thus only slightly affecting to the chain retention properties of these teeth.

In some embodiments, the set comprises:
One or several additional up-shift segments for chain shifting from the first chain-ring to the second chain-ring, which are configured for the shift like the up-shift segment;
One or several additional up-shift segments for chain shifting from the second chain-ring to the first chain-ring, which are configured for the shift like the down-shift segment.

In this way there are many moments in the rotation cycle to carry out an optimum shift from the first chain-ring to the second chain-ring and from the second chain-ring to the first chain-ring.

Some of these embodiments comprise complementary segments for completing the big chain-ring which are not configured for the shift neither as an up-shift segment nor as a down-shift segment.

Besides the previously mentioned segments, it is possible to arrange other segments, as for example a segment subsequent to a down-shift segment defined by chain-ring down-shift conditions and previous to an up-shift segment defined by chain-ring up-shift conditions. This segment would be a segment necessary for completing the second chain-ring when the up-shift cut of the up-shift segment could not coincide with the down-shift cut of the down-shift segment. This segment would be the last segment that would keep its position in the shift to a big chain-ring, and the first one in moving in the shift to a small chain-ring. Additionally, there could also be segments in a section subsequent to a up-shift segment and previous to a down-shift segment, for example, for reaching smaller segments that make easier their displacement.

In some embodiments, one or many sets started by an up-shift segment or an additional up-shift segment and terminated by a down-shift segment or an additional down-shift segment form a single shift segment with a first tooth and last tooth, such that they are segments which allow both an optimum shift from the first chain-ring to the second chain-ring and an optimum shift from the second chain-ring to the first chain-ring.

The important part of an up-shift segment is an initial cut that favours an optimum shift to a big chain-ring, whereas the important part of a down-shift segment is its final cut that favours an optimum shift to a small chain-ring. These two cuts could form a single segment (comprising a union between an up-shift segment with a down-shift segment with eventually intermediate segments placed there between). According to the dimensions of both chain-rings and operating conditions, this could be a small segment easy to move, or a big segment that exhibits more problems in its displacement. In this latter case, possible solutions could be to use a pulley to increase the chain free zone, carry out the displacement when the final part of the segment is still engaged with the chain in its disengagement from the chain-ring such that it would laterally displace the chain in the shifting movement, or the case wherein the segment would have some flexibility such that the starting part subjected to a shift to a bigger chain-ring would completely move, whereas the final part subjected by the chain in its disengagement would not move or would do it lesser.

In some embodiments, the first and second chain-rings are circular, oval or variable radius chain-rings.

The proposed disclosure is valid for chain-rings with any shape, and in all of them the shifting process is just as fast, smooth, efficient and reliable. On the contrary, the systems based on derailleurs exhibit major drawbacks in the shift with non-circular chain-rings like, for example, the oval chain-rings widely used in the market. In such a way, the operating advantages of the proposed system are even better in these chain-rings having non constant radius, in spite of this fact not being mentioned in the prior art corresponding to laterally displacing segmented chain-rings. This may be because in chain-rings having variable radius it is not possible to all the segments to have the same shape as it is the case with the segments of the segmented chain-rings systems already disclosed. In these chain-rings having variable radius it is necessary to segment the chain-rings in a particular way as disclosed in the present disclosure.

In some embodiments, the first and second chain-rings have an even number of teeth, in which wide teeth and narrow teeth alternate synchronized with the wide and narrow links of the chain.

One limitation of the segmented chain-rings systems of the state of the art is its lower guiding and retention of the chain with respect to the systems based on derailleurs. For overcoming this drawback, it is possible to widen the teeth that will coincide with wide links such that they are better retained. To keep the synchronism without interruption it is necessary that both chain-rings have an even number of teeth and that the processes for chain-ring shifting are carried out in points wherein this synchronism is also conserved.

In some embodiments, the engaged chain-link of the up-shift section which is engaged with the first tooth of the segment or of the segments for chain shifting from the first chain-ring to the second chain-ring is a wide link.

As it is known, most of the chains successively connect wide links and narrow links, which ends lie between the plates, more external, of the wide links. If it is ensured that the first link that will contact the first segment that initiates the shift to a bigger chain-ring is a wide link, due to an increased internal engaging space of this link with the teeth, a more significant distance of the segment displaced out of the normal operating plane of the first chain-ring thus ensuring even in this conditions a proper engagement can be tolerated, where by normal operation it is understood that there is no shift being carried out. To ensure that this condition is fulfilled without interruption, it is necessary to keep the synchronism between the chain-ring and the chain, thus making necessary that both chain-rings have an even number of teeth. In the case that this tooth had an additional thickness it would be advisable to sharpen its tip to facilitate the engagement. This is especially useful when the chain is engaged with a rear sprocket small or big such that the operating plane of the chain forms an angle with respect to the plane of the chain-ring where it lies.

It should be pointed out that the first link of the chain is not a specific or unique link of the chain, but it can be any link that will engage with the first tooth of the first segment that will change between revolutions of the chain-rings and in any revolution it will possible to carry out the process for chain-ring shifting. It is also understood that the links mentioned in the rest of the document can make reference to any other link of the chain in the same situation.

In some embodiments, the first link subsequent in the engagement to the engaged chain-link of the down-shift section wherein the seating area is greater than the 50% of the complete seating area when the roller of the down-shift section contacts the front flank of the first tooth of the first chain-ring in a configuration for shifting from the second chain-ring to the first chain-ring, the so-called centering link, is a wide link.

In case the synchronism of the engagement of the wide/narrow links with the teeth is maintained, it is preferable that the first link which contacts a tooth of the first chain-ring to be a wide link that offers a major tolerance for the centering and guiding of the chain in the shift from chain-ring, which is especially useful when the chain is engaged with a small or big rear sprocket and the operating plane of the chain forms a small angle with respect to the plane of the chain-ring where it lies.

The centering link will fulfil with its guiding and centering function during the seating process on the corresponding centering tooth. Then, for obtaining a good guiding and centering it is necessary that the seating of this link is sufficient. The seating area can be established as the overlapping area between tooth and link in a lateral projection when the engaging roller of the down-shift section contacts the front flank of the first tooth of the first chain-ring in a configuration for shifting from the second chain-ring to the first chain-ring. The complete seating area is defined as the seating area of a tooth wherein the chain is completely seated. And the seating degree of a tooth is established by comparing its seating area with respect to this complete seating area.

In some embodiments, each chain-ring or chain-ring segment is formed by a support part of the teeth and a teeth part, wherein the support parts of both chain-rings are always in different planes.

In a segmented chain-rings system like the proposed one, wherein the engagement is optimum both in the up-shift and in the down shift, there is a tolerance for the segments of the second chain-ring to lie in a different plane from the first chain-ring plane thus overcoming a limitation/condition of the segmented chain-rings systems of the state of the art. Furthermore, in the case that the contact in the shifts is initiated with a wide link, the admissible difference between planes is bigger, for example, the corresponding to the thickness of the support part of the chain-rings. This latter allows that each chain-ring has its support thickness in differentiated planes, thus ensuring enough resistance and stiffness even when the size of both chain-rings is very similar, as for example in the case of a four teeth difference, which is the appropriate for the "half-step" shifting strategy. For example, with two chain-rings having 48 and 52 teeth, and 9 rear sprockets having 11 to 43 teeth, 18 relations are obtained, all useful, that cover the same range than a common transmission but with more uniform hops between 7.7 and 10.8% which exhibits a better staggering of the transmission relations and a more simple and clear shift logic, when compared with the strategies currently used.

According to a second aspect of the disclosure, the disclosure proposes methods for the determination of the relative positioning between chain-rings optimum for shifts from small chain-ring to big chain-ring, from big chain-ring to small chain-ring, or trade-off solutions wherein in the same chain-rings set the shifts from small chain-ring to a big one and vice versa are optimised.

According to a first variant of this second aspect of the disclosure, a method is proposed In a chain-rings set for a power transmission system comprising a chain, a first chain-ring, a second chain-ring having a common axis with the first chain-ring and provided with more teeth than the first chain-ring, wherein a shifting configuration with tensed chain section is defined, wherein the second chain-ring is formed by independent segments, such that each segment is delimited by two segmentation cuts, which comprises axial displacement means of the segments such that they can be moved in an independent manner at least in the direction of the common axis, wherein an up-shift segment has a first tooth which is the first to be engaged with the chain in the rotation movement, a point of the valley previous to the first tooth corresponding to the point wherein the segmentation of the up-shift segment starts;

For the determination of achieving an ideal shift from the first chain-ring to the second chain-ring, of the angular position between the first chain-ring and the second chain-ring and determination of the valley of the second chain-ring wherein the segmentation starts, which comprises the following steps:

a. Determine in the first chain-ring an angle interval wherein the force between the first chain-ring and the tensed chain section is transmitted, the extreme angles of this interval being symmetrical with respect to a reference radius which is perpendicular to the tensed chain section, wherein an arc subtended by said interval corresponds to the chain pitch;

b. Determine in the angle interval the optimum angle for shifting from the first chain-ring to the second chain-ring, for which the distance between:

A first intersection, between the radius corresponding to said optimum angle and a primitive line of the first chain-ring having radius r wherein the centre of the chain roller must fall and therefore respect thereof the valley of the teeth of the first chain-ring is defined; and A second intersection, between the straight line passing through the first intersection and which is perpendicular to the reference radius and a primitive line of the second chain-ring having radius R, wherein the centre of the chain roller must fall and therefore respect thereof is defined the valley of the teeth of the second chain-ring, in a rearmost position during the rotation;

Is a multiple of the chain pitch, such as an optimum angle between the radius passing through the first intersection and a radius passing through the second intersection is defined;

c. Arranging the first chain-ring and the second chain-ring with a relative angular position wherein:

The lowest point of a valley of the first chain-ring is located in a radius forming an optimum angle with the reference radius; and The lowest point of the valley of the second chain-ring previous to the first tooth, which is the valley wherein the segmentation starts of the first segment, is located in a radius forming an optimum relative angle between valleys with the radius corresponding to the optimum angle;

Such that the chain can seat in both valleys in the moment for shifting from the first chain-ring to the second chain-ring, with a simultaneous traction on the tensed chain section exerted by the last tooth of the first chain-ring and the first tooth of the second chain-ring.

According to a second variant of this second aspect of the disclosure, a method is proposed:

In a chain-rings set for a power transmission system comprising a chain, a first chain-ring, a second chain-ring having a common axis with the first chain-ring and provided with more teeth than the first chain-ring, wherein a shifting configuration with a tensed chain section is defined, wherein the second chain-ring is formed by independent segments, such that each segment is delimited by two segmentation cuts, which comprises axial displacement means of the segments such that they can be moved in an independent manner at least in the direction of the common axis, wherein a down-shift segment has a last tooth, which is the last tooth engaging with the chain in the rotation movement, the subsequent valley to the last tooth corresponding to the valley wherein terminates the segmentation of the down-shift segment;

For the determination, to achieve an ideal shift from the second chain-ring to the first chain-ring, of the angular position between the first chain-ring and the second chain-ring and determination of the subsequent valley to the last tooth of the second chain-ring wherein the segmentation is carried out, which comprises :

a. Determine in the first chain-ring the angle interval wherein the force between the first chain-ring and the tensed chain section is transmitted, the extreme angles of this interval being symmetrical with respect to a reference radius which is perpendicular to the tensed chain section, wherein the arc subtended by said interval corresponds to the chain pitch;

b. Determine in the angle interval the optimum angle for shifting from the second chain-ring to the first chain-ring, for which the distance between:

A first intersection, between a radius corresponding to said optimum angle and a primitive line of the first chain-ring having radius r; and A second intersection, between the straight line passing through the first intersection and which is perpendicular to the reference radius and a primitive line of the second chain-ring having radius R in a more advanced position in the rotation;

Is a multiple of the chain pitch, such that an optimum relative angle between the radius passing through the first intersection and a radius passing through the second intersection is defined;

c. Arranging the first chain-ring and the second chain-ring with a relative angular position wherein:

The lowest point of a valley of the first chain-ring is located in a radius forming an optimum angle with the reference radius; and The lowest point of a valley of the second chain-ring is located in a radius forming an optimum relative angle with the radius corresponding to the optimum angle;

Such that the chain can seat in both valleys in the moment for shifting from the second chain-ring to the first chain-ring, and such that a simultaneous traction on the tensed chain section exerted by a last tooth of the second chain-ring and a first tooth of the first chain-ring is obtained.

According to a third variant of this second aspect of the disclosure, a method is proposed for determining, in a set according to any of the variants of the disclosure given above, of the relative position between chain-rings and for the determination of at least a valley for the start of the segmentation for an up-shift segment and at least a valley for the start of the segmentation for a down-shift segment, which comprises:

a. Determining the distance according to step b) of the method according to the first or second variant of the second aspect of the disclosure;

b. For each pair of valleys of the first chain-ring and the second chain-ring, and as a function of the angular relative position between chain-rings, determine if the contact between the engaged roller of the up-shift section and the first tooth of the up-shift segment is produced in the front flank or in the upper part of the tooth, and determine in the first case the height with respect to the primitive line of the second chain-ring, of the engaging point between the engaged roller of the up-shift section and the first tooth of the up-shift segment;

c. For each pair of valleys of the first chain-ring and the second chain-ring, and as a function of the angular relative position between chain-rings, determine if the contact between the engaged roller of the down-shift section and the first tooth of the first chain-ring is produced in the front flank or in the upper part of the tooth, and determine in the first case the height with respect to the primitive line of the first chain-ring, of the engaging point between the engaged roller of the down-shift section and the first tooth of the first chain-ring;

d. Establish a maximum acceptable contact height both for the up-shift and the down-shift;

e. Segment the second chain-ring in at least a pair of up-shift and down-shift valleys for which the height is less than the maximum acceptable contact height.

Preferably, in the first variant of the second aspect of the disclosure, the first and second chain-rings have an even number of teeth and are formed by a wide and narrow teeth succession and wherein the first tooth of the up-shift segment is a wide tooth.

To ensure the engagement it is preferable that the first contact with the segment of the big chain-ring is carried out with a wide link, that is, that the first tooth of the segment can be a wide tooth.

Preferably, in the second variant of the second aspect of the disclosure, the first and second chain-rings have an even number of teeth and are formed by a wide and narrow teeth succession and wherein the centering tooth of the first chain-ring is a wide tooth.

To ensure the engagement it is preferable that the first contact with the small chain-ring is carried out with a wide link, that is, that the centering engaged tooth can be a wide tooth.

Preferably, in the third variant of the second aspect of the disclosure, the first and second chain-rings have an even number of teeth and are formed by a wide and narrow teeth succession and wherein the first tooth of the up-shift segment and the centering tooth of the first chain-ring are wide teeth.

The concepts described can also be applied to other equivalent configurations and different sizes and can be applied to other fields wherein a smooth and precise transmission power with multiple relations is needed.

BRIEF DESCRIPTION OF THE DRAWINGS

To complete the description and in order to enable a better understanding of the disclosure, a set of drawings is provided. Said drawings form an integral part of the description and illustrate embodiments of the disclosure, which should not be interpreted as restricting the scope of the disclosure, but just as an example of how the disclosure can be carried out. The drawings comprise the following figures.

DETAILED DESCRIPTION

As shown in the figures, the disclosure relates to a chain-rings set 1, 2 for a bicycle power transmission system, which comprises a chain 3, a first chain-ring 1, a second chain-ring 2 having a common axis E with the first chain-ring 1 and provided with more teeth than the first chain-ring 1, that is to say, that the second chain-ring is greater than the first chain-ring.

Figure 8:
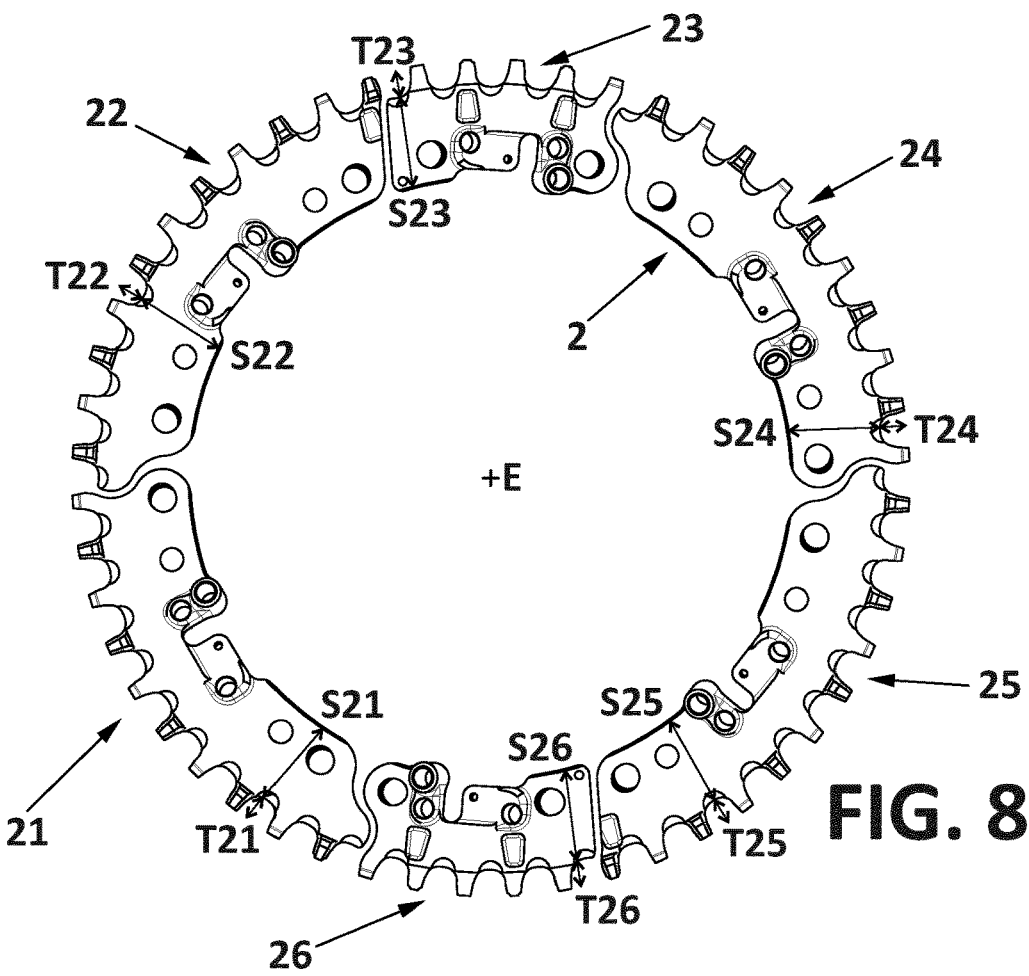
FIG. 8 shows the components of the big chain-ring, that is the segments.
Figure 10:
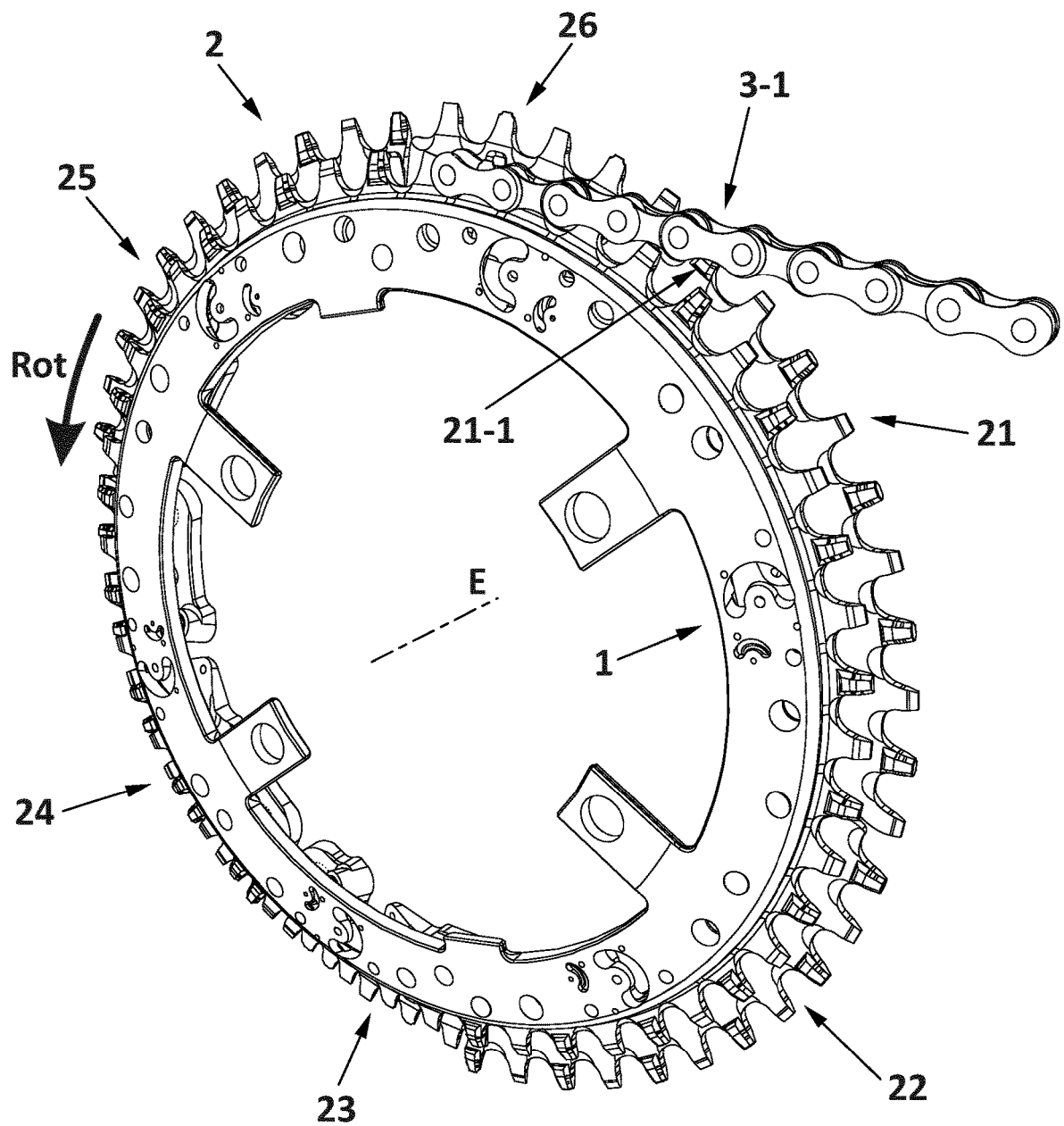
FIG. 10 shows the set composed of a small chain-ring, a big chain-ring and a chain in the configuration for shifting from the small chain-ring to a big chain-ring.
Figure 11:
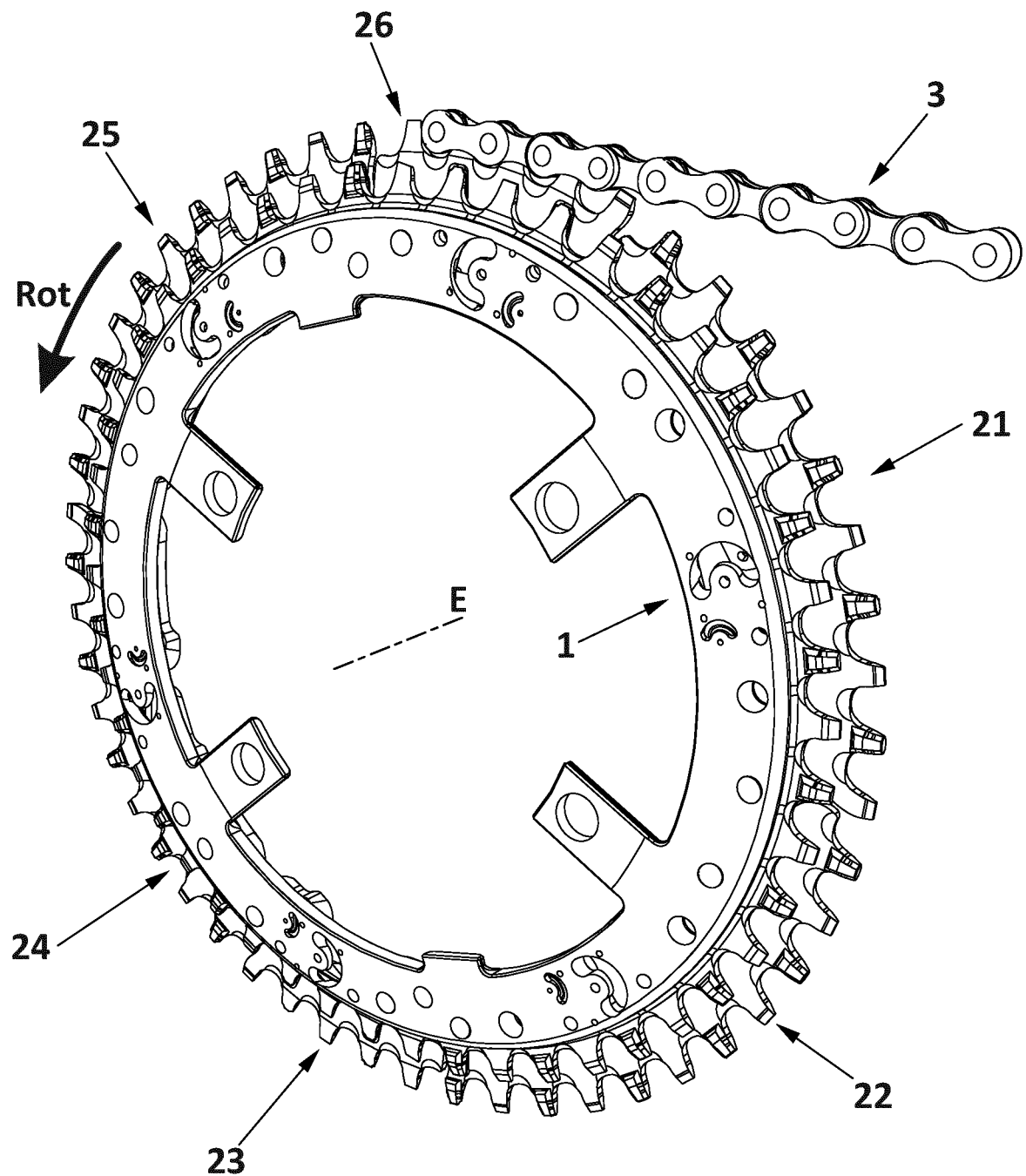
FIG. 11 shows the set composed of a small chain-ring, a big chain-ring and a chain in the configuration wherein the power is transmitted through the big chain-ring.
Figure 12:
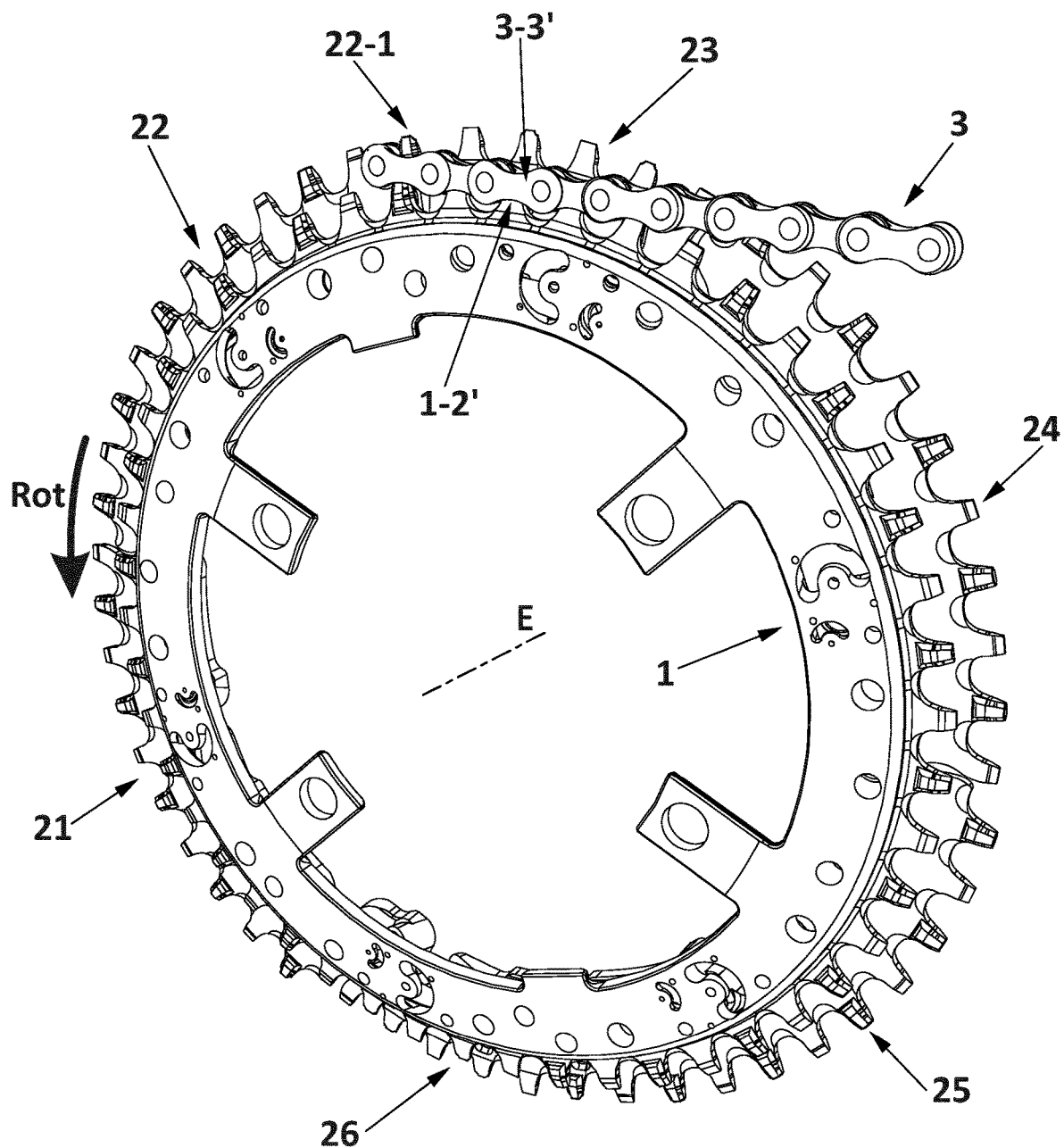
FIG. 12 shows the set composed of a small chain-ring, a big chain-ring and a chain in the configuration for shifting from a big chain-ring to a small chain-ring.

As shown in FIG. 8, the second chain-ring 2 is formed by independent segments 21, 22, 23, 24, 25, 26 comprising axial displacement means of the segments 21, 22, 23, 24, 25, 26 such that they can be moved in an independent manner at least in the direction of the common axis E. Each one of the segments 21, 22, 23, 24, 25, 26 can be moved between two positions; a first position, shown for example in FIG. 11, wherein the segments 21, 22, 23, 24, 25, 26 of the second chain-ring 2 are over the first chain-ring 1 in a same plane or in a close plane such that the engagement of the chain 3 with the first chain-ring 1 is prevented and instead forces that it engages with the second chain-ring 2, and a second position, shown for example in FIG. 9, wherein the segments 21, 22, 23, 24, 25, 26 of the second chain-ring 2 are away from the first chain-ring 1, thus leaving enough lateral space to the chain 3 for engaging the first chain-ring 1. The transition between the first engaging position to the second chain-ring 2 and the second engaging position to the first chain-ring 1, shown for example in FIGS. 10 and 12, are carried out sequentially moving the segments 21, 22, 23, 24, 25, 26 preferably in the chain free zone, which is defined as the angular interval during the power transmission wherein none of the chain-ring 1 and 2 teeth of the interval contacts the chain.

Figure 3:
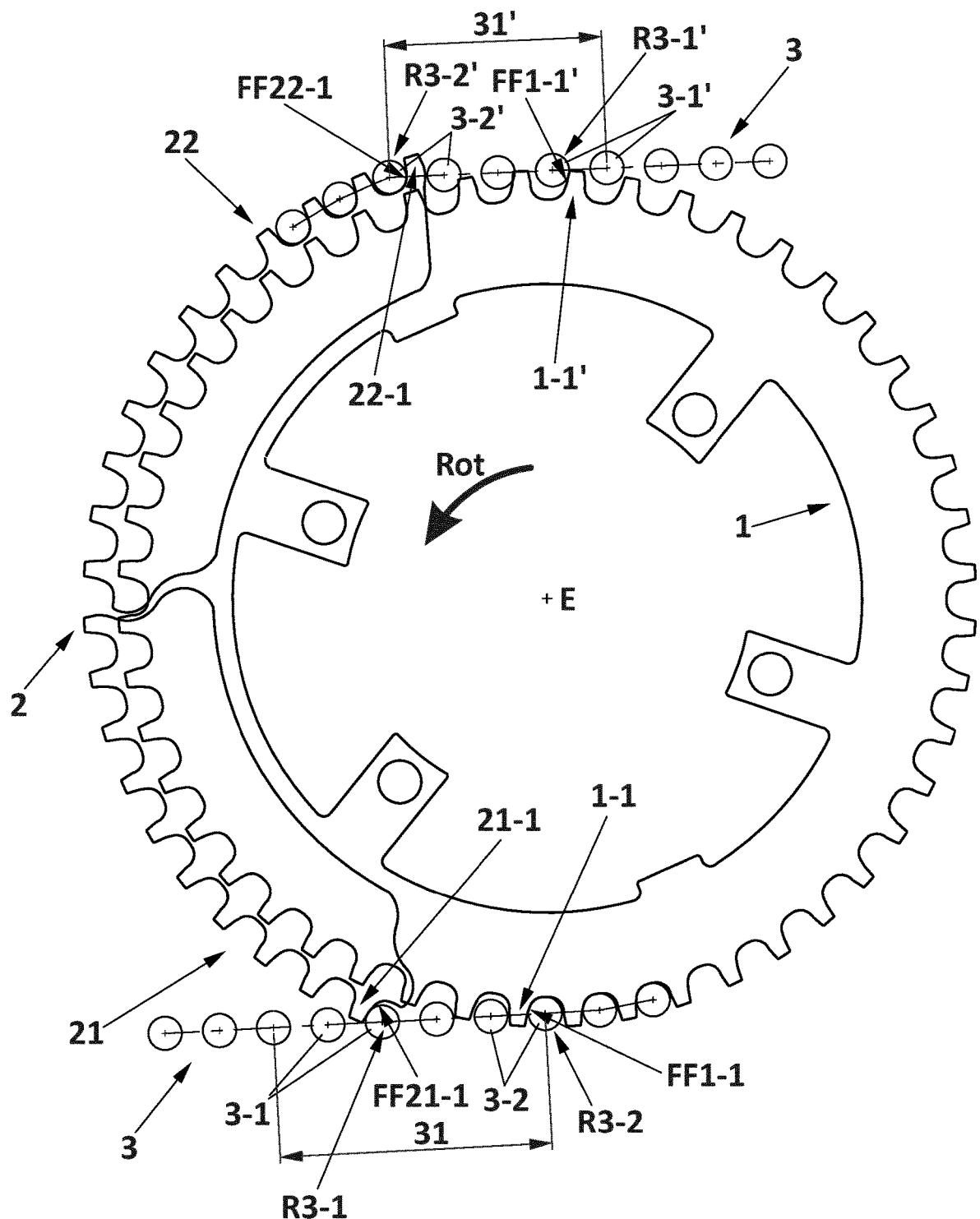
FIG. 3 shows the engagement of the chain between the small chain-ring and the up-shift segment of the big chain-ring, and simultaneously also shows the engagement of the chain between the down-shift segment of the big chain-ring and the small chain-ring in a different moment.

Unlike the known prior art, each one of the segments 21, 22, 23, 24, 25, 26 has a specific function in the shifting process between both power transmission positions such that in this case a specific order in its displacement in the shift processes must be respected. For example, the first segment 21, called up-shift segment 21, is the first segment to approach the first chain-ring 1 to intervene in the shift from the first chain-ring 1 to the second chain-ring 2, as shown in FIG. 3. On the other hand, the second segment 22, called down-shift segment 22, is the last segment to keep in the position close to the first chain-ring 1 to intervene in the shift from the second chain-ring 2 to the first chain-ring 1, as also shown in FIG. 3.

FIG. 3 shows how the up-shift segment 21 is angularly arranged in a specific position with respect to the first chain-ring 1 such that when starting from a situation wherein the chain 3 is engaged in the last tooth 1-1 of the first chain-ring 1 with a determined direction, the rotation Rot of the chain-rings 1, 2 implies that the engagement chain-link 3-1 of the up-shift section 31 of the chain 3 contacts the front flank FF21-1 of the first tooth 21-1 of the up-shift segment 21. In FIG.3 the same angular configuration between the first chain-ring 1 and the second chain-ring 2 is also shown, and according to the specific segmentation proposed for the second chain-ring 2, implies a position of the down-shift segment 22 with respect to the first chain-ring 1 wherein starting from a new situation wherein the chain 3 is engaged in the last tooth 22-1 of the down-shift segment 22 with a new determined direction, the rotation Rot of the chain-rings 1, 2 implies that the engagement chain-link 3-1' of the down-shift section 31' of the chain 3 contacts the front flank FF1-1' of the first tooth 1-1' of the first chain-ring 1.

It is important to point out that the contact of any roller R3-1, R3-2, R3-1', R3-2' of the links 3-1, 3-2, 3-1', 3-2' of the up-shift 31 or down-shift 31' sections of the tensed chain 3 is produced in the frontal flanks FF21-1, FF1-1, FF1-1', FF22-1 of the teeth 21-1, 1-1, 1-1', 22-1 of the chain-rings 1, 2. The frontal flanks of the teeth are approximately perpendicular to the chain 3, such that the pressure of the roller on the tooth is carried out approximately in a normal direction, this being the most efficient way of transmitting the force between the chain-ring 1, 2 and the chain 3. In this way it is ensured that the force transmission during the shifting process is as efficient as during the transmission in the first chain-ring 1 or second chain-ring 2, thus implying that the accuracy, smoothness and efficiency of the shift from chain-ring of this disclosure is better than in the known prior art.

Figure 4:
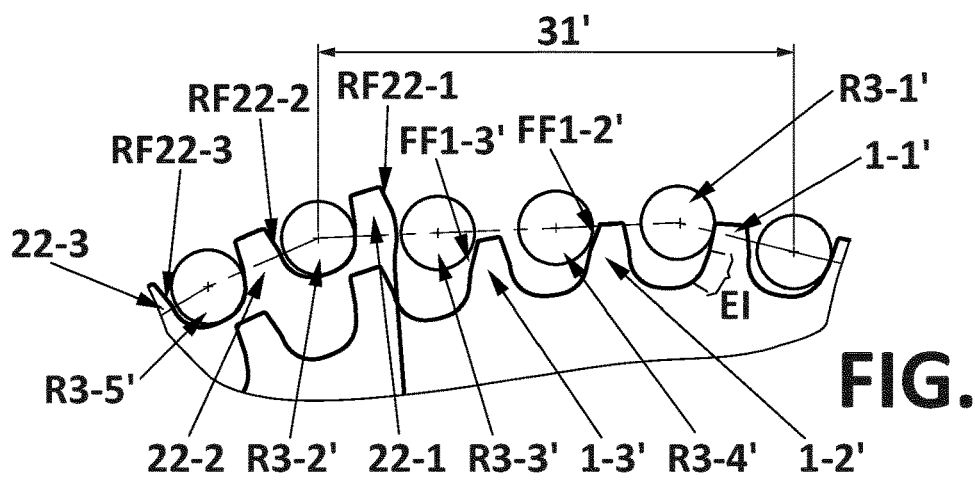
FIG. 4 is a zoom of the engagement of the chain in a down shift from a big chain-ring to a small chain-ring.

A further advantage in ensuring that the contact in the frontal flanks of the teeth in the shifts between the chain-rings 1 and 2, is that as shown in FIG. 3 the roller R3-1, R3-1' is close to the engagement interval EI wherein the contact between tooth and chain 3 is produced in configurations not for shifting from the transmission in the first chain-ring 1 and the second chain-ring 2 as shown for example in FIG. 4, such that the seating phase III will be shorter, and a faster shifting process is obtained. The counterpart is that as previously mentioned due to the specialization of the segments, the shifting process can only be started in specific points of the pedalling cycle, such that this delay can significantly delay the shifting process in some occasions.

To achieve the mentioned force transmission properties it is necessary to avoid any contact of the chain 3 with the chain-rings 1, 2 different than the one previously indicated as shown in FIG. 4. In this regard, the segmentation cut of the down-shift segment 22 prolongs the rear flank RF22-1 such that it does not interfere with the roller R3-3' subsequent to the engaged roller R3-2' of the down-shift section 31' in the position for shifting from the second chain-ring 2 to the first chain-ring 1. and the frontal flanks FF1-2', FF 1-3' of the teeth 1-2', 1-3' prior to the first tooth 1-1' for engagement of the first chain-ring 1 are cut down so as not to interfere with the rollers R3-4', R3-3' of the down-shift section 31' of the chain 3 subsequent to the engaged roller R3-2' of the down-shift section 31' and prior to the engagement roller R3-1' of the down-shift section 31' in the position for shifting from the second chain-ring 2 to the first chain-ring 1. It is important to any cut down of the frontal flanks to be carried out above the engagement interval EI, such that this cut does not affect to the engagement of the chain in configurations no for shifting from the transmission in the first chain-ring 1 and the second chain-ring 2.

Figure 6:
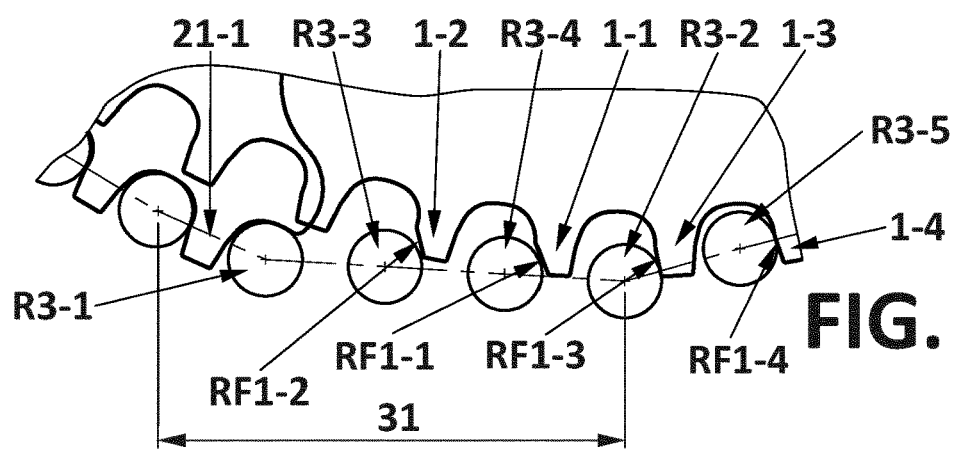
FIG. 6 is a zoom of the seating of the chain in the area for shifting from the up-shifting from the small chain-ring to the big chain-ring in the moment of unseating.

The proposed disclosure, besides improving the engagement or seating of the chain in the area for chain-ring shifting also brings an improvement of the unseating in the same area. As previously explained, the roller which engages any tooth in the engagement interval EI of the tooth will progressively move along the pedalling cycle, going down to the valley for subsequently even loose contact with the front flank and head to the rear flank before the unseating moment. The same occurs in the shift area which affects both chain-rings 1, 2, but in this area, since the contact is produced in a point more external of the front flank FF21-1 or FF1-1', the displacement of the roller R3-1 or R3-1' is higher during the pedalling cycle, such that the previous rollers are pushed against the rear flank of the previous tooth in a different way from the non-shifting configuration, and that could imply problems in the unseating of those rollers, and in this regard it may be desirable that the last tooth 22-1 of the down-shift segment 22 and/or any of the previous teeth 1-1, 1-2, 1-3, 1-4 to the first tooth 21-1 of the up-shift segment 21 have a recess in the rear flank RF22-1, RF1-1, RF1-2, RF1-3, RF1-4 so as not to interfere with the rollers R3-3', R3-4, R3-3, R3-2, R3-5 of the chain 3 in the moment of unseating of the chain 3 of the chain-ring 1, 2 in any shift position, as shown in FIGS. 4 and 6.

FIG. 8 shows that, according to a preferred embodiment, the set comprises:

One or several additional up-shift segments 24 for chain shifting 3 from the first chain-ring 1 to the second chain-ring 2, which are configured for the shift like the up-shift segment 21;

One or several additional up-shift segments 25 for chain shifting 3 from the second chain-ring 2 to a first chain-ring 1, which are configured for the shift like the down-shift segment 22.

For a determined relative angular position between both chain-rings it is possible to define many pairs of teeth 21-1—1-1 and 22-1—1-1' that meet the optimum engagement condition, as disclosed according to other aspects of the disclosure and according to the method that will be described below. Then, taking as a reference the teeth 21-1 and 22-1 found the second chain-ring 2 can be segmented in multiple up-shift segments 21-24 or down-shift segment 22-25.

Also complementary segments 23-26 can be provided, as shown in FIG. 8 for completing the big chain-ring 2 which are not configured for the shift like the up-shift segment 21 neither like the down-shift segment 22, as for example a complementary segment 23-26 subsequent to a down-shift segment 22-25, defined by down-shift conditions of the chain-ring, and previous to an up-shift segment 21-24, defined by chain-ring up-shift conditions. This segment will be necessary when the up-shift cut of the up-shift segment 21-24 cannot coincide with the down-shift cut of the down-shift segment 22-25. This complementary segment 23-26 would be the last segment in keeping its position in the shift from the first chain-ring 1 to the second chain-ring 2, and the first in moving in the shift from the second chain-ring 2 to the first chain-ring 1. Additionally, there could also be complementary segments in a section subsequent to a first segment 21-24 and previous to a second segment 22-25, for example, for reaching smaller segments that make their displacement easier.

Figure 16:
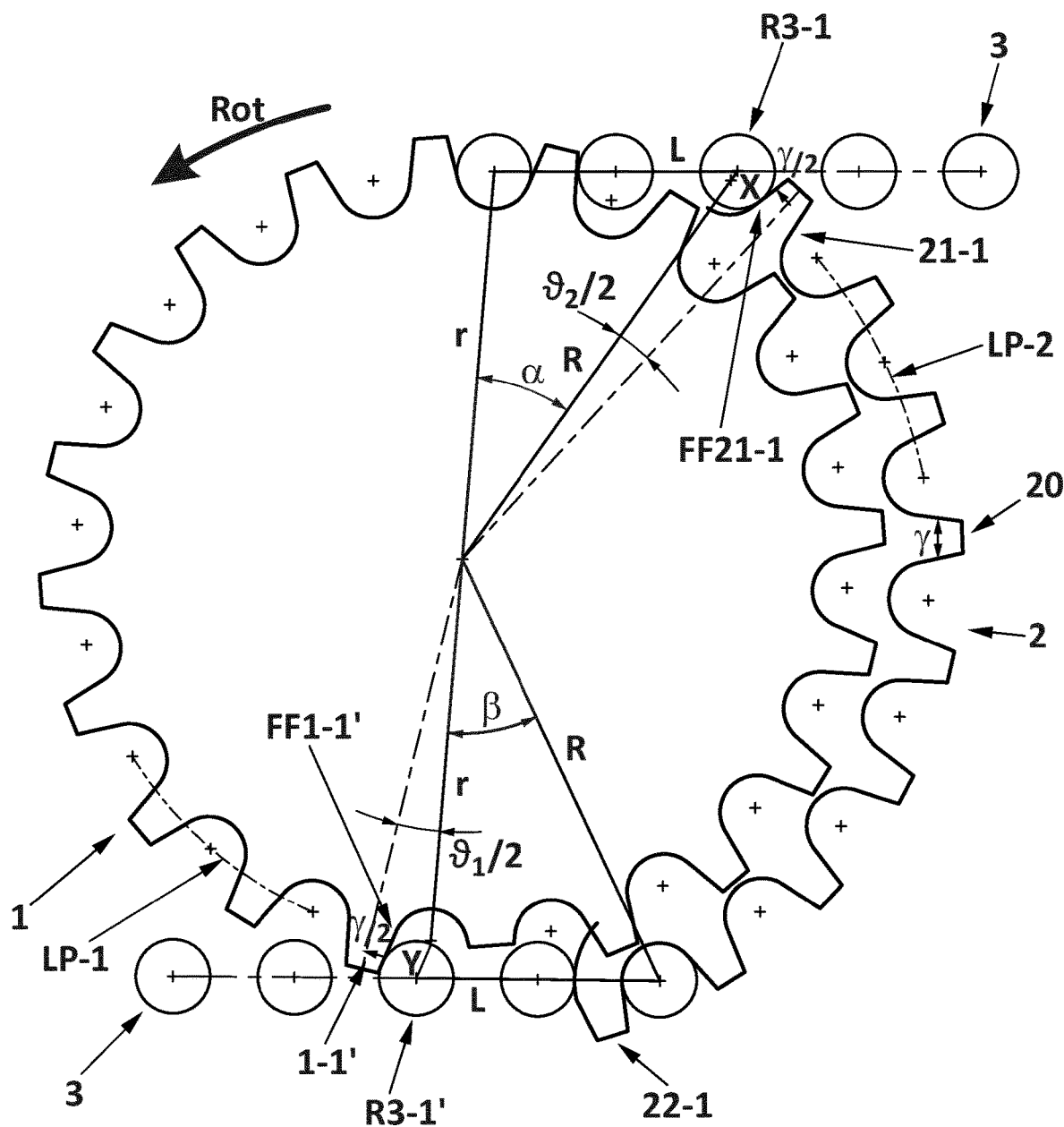
FIG. 16 shows the basic components considered for the optimum up-shifts and down-shifts.
Figure 20:
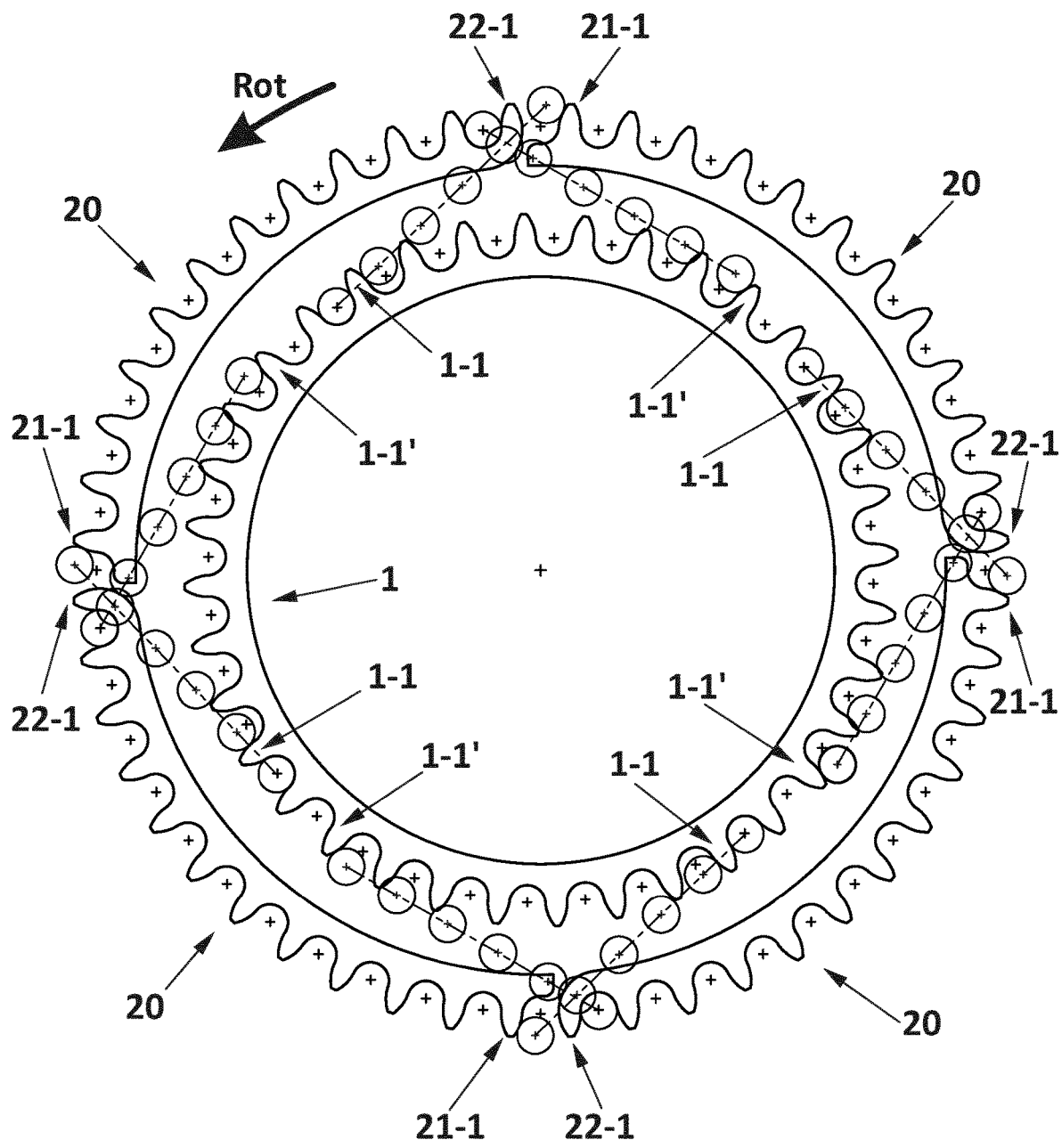
FIG. 20 shows the segmentation of a 48 teeth chain-ring in four shift segments and the possible up-shift and down-shift points respect to a 36 teeth chain-ring are simultaneously depicted.

As shown in FIGS. 16 and 20, it may be also foreseen that one or several sets of segments started by an up-shift segment 21 or an additional up-shift segment 24 and terminated by a down-shift segment 22 or an additional down-shift segment 25 form a single shift segment 20 with a first tooth 21-1 and a last tooth 22-1, such that they are segments which allow both an optimum shift from the first chain-ring 1 to the second chain-ring 2 and an optimum shift from the second chain-ring 2 to the first chain-ring 1.

The important part of an up-shift segment 21-24 is an initial up-shift cut, that favours an optimum shift to a big chain-ring, whereas the important part of a down-shift segment 22-25 is its final down-shift cut that favours the optimum shift to a small chain-ring. These two cuts could form a single shift segment 20. In other words, it would comprise the grouping of an up-shift segment 21-24 with a down-shift segment 22-25 with possible complementary segments that would lie in between. According to the dimensions of both chain-rings 1, 2 and operating conditions, this could be a small segment easy to move, or a big segment that would exhibit more problems in its displacement. In this latter case, solutions like using a pulley to increase the chain free zone could be used, carry out the displacement when the final part of the segment is still engaged with the chain in its disengagement of the chain-ring such that it would laterally move the chain in the shifting movement, or the case wherein the segment had some flexibility such that the starting part subjected to a shift to a bigger chain-ring would move completely, whereas the final part subjected by the chain in its disengagement would not move or would displace to a lesser extent.

Figure 28:
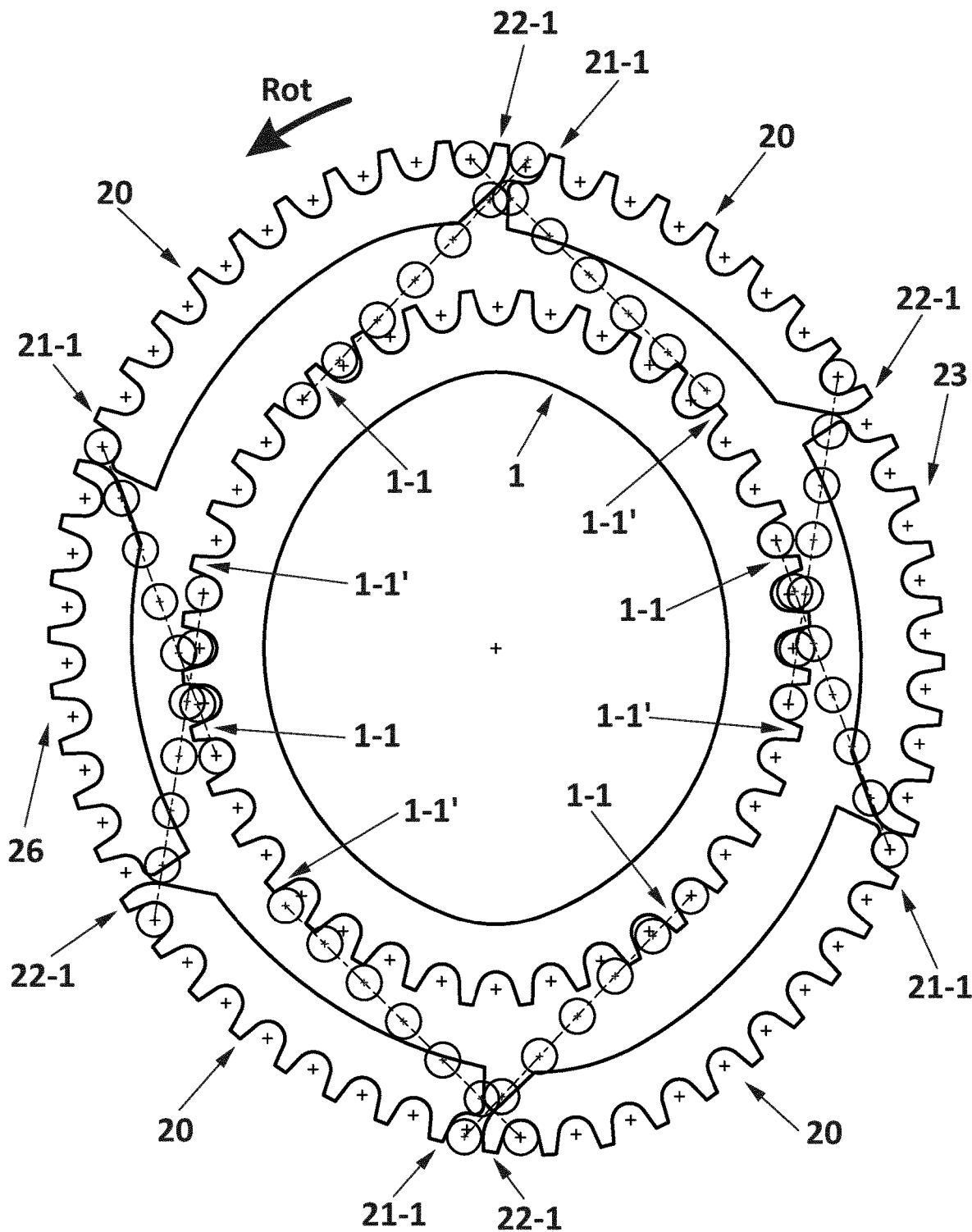
FIG. 28 shows the segmentation of a 52 teeth oval chain-ring in four shift segments and two complementary segments, and the possible up-shift and down-shift points with respect to a 36 teeth oval chain-ring are simultaneously depicted.

The segmentation of the second chain-ring 2 disclosed, its orientation with respect to the first chain-ring 1, and the cut-down of the teeth can be applied to a circular chain-ring as shown in FIG. 3, 16 or 20, although they can also be applied to an oval chain-ring as shown in FIG. 28, or to any other chain-ring having variable radius.

As shown in FIGS. 9 to 12, the first 1 and second 2 chain-rings have an even number of teeth, in which wide teeth and narrow teeth alternate synchronized with the wide and narrow links of the chain 3. In this case it is also important to keep the synchronism of the wide and narrow links with the wide and narrow teeth in the shift processes. Adapting the width of the tooth to the width of the link implies a better retaining of the chain 3 in the chain-rings 1, 2.

Figure 5:
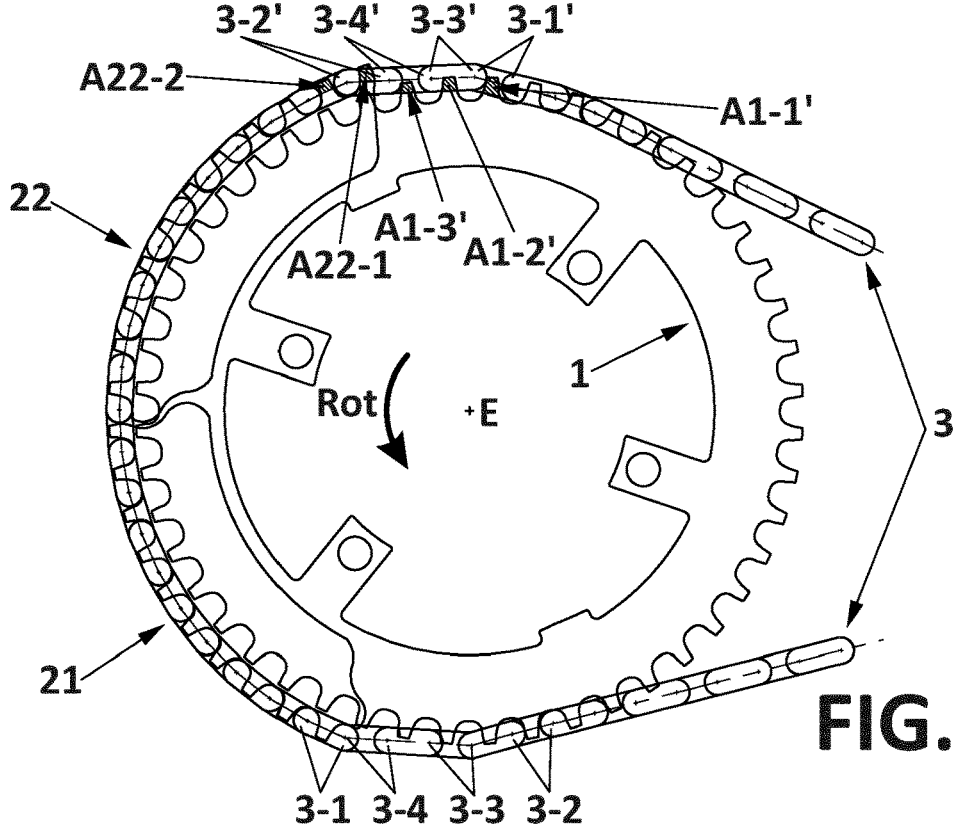
FIG. 5 shows the progressive seating of the chain in the small chain-ring and big chain-ring set, in the position wherein a shift from small chain-ring to big chain-ring and a shift from a big chain-ring to a small chain-ring are included.

As also shown in FIGS. 5 and 10 the engagement chain-link 3-1 of the up-shift section 31 which is engaged with the first tooth 21-1 of the segment or of the segments 21, 24 for chain shifting 3 from the first chain-ring 1 to the second chain-ring 2 is a wide link.

In a similar way and as shown in FIG. 5 and in FIG. 12, the centering link 3-3' subsequent to the engaged chain-link 3-2' of the down-shift section 31' wherein the seating area A1-2' is greater than the 50% of the complete seating area A22-1' when the engaging roller R3-1' of the down-shift section 31' contacts the front flank FF1-1' of the first tooth 1-1' of the first chain-ring 1 in a configuration for shifting from the second chain-ring 2 to the first chain-ring 1, is also a wide link.

In this way, thanks to the greater internal width of the link there is greater tolerance when centering the chain 3 on the tooth and initiate the seating, which is advantageous for example when the rear smallest o biggest sprocket is engaged and the chain operates with some inclination with respect to the plane of the first 1 or second 2 chain-ring.

When using wide and narrow teeth in the chain-rings 1, 2 for keeping the centering properties of the wide links 3-1 and 3-3' it would be necessary to sharpen the tip of the wide teeth 21-1 and 1-2' to facilitate the initial seating.

Figure 7:
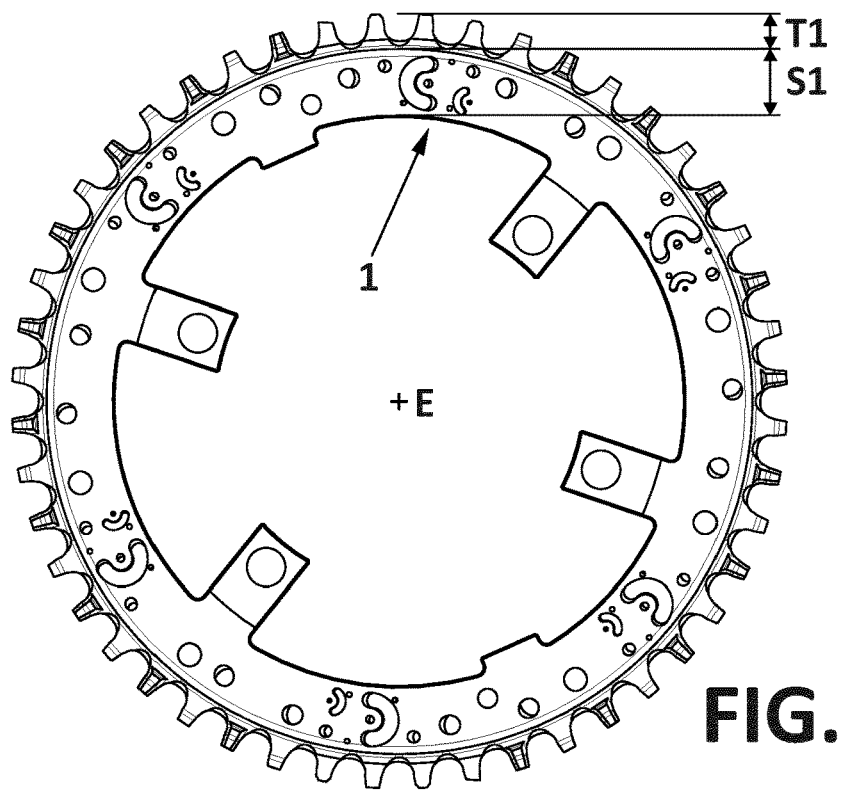
FIG. 7 shows the small chain-ring isolated. It is a non-segmented chain-ring.

Thanks to the centering properties of the wide links it could correctly operate without the segments 21, 22, 23, 24, 25, 26 completely moving to the plane of the first chain-ring 1 as shown in FIGS. 9-12. There, according to FIGS. 7 and 8 it can be defined that each chain-ring 1, 2 or chain-ring segment 21, 22, 23, 24, 25, 26 is formed by a support part S1, S21, S22, S23, S24, S25, S26 of the teeth and a teeth part T1, T21, T22, T23, T24, T25, T26, and wherein the support parts of both chain-rings 1, 2 are always in different planes.

Figure 1:
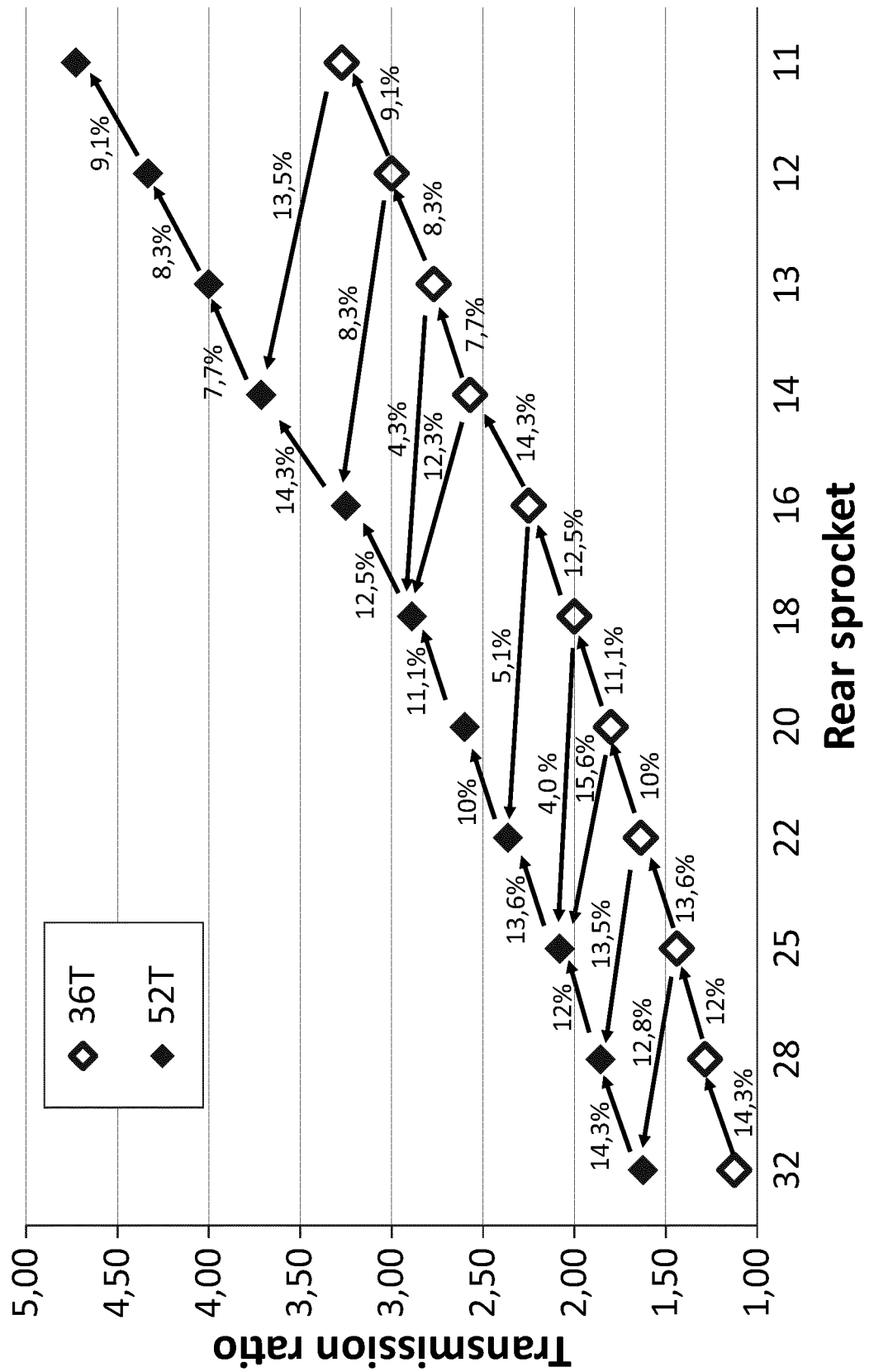
FIG. 1 shows the transmission relations and the shifting strategies mainly used in the state of the art.
Figure 2:
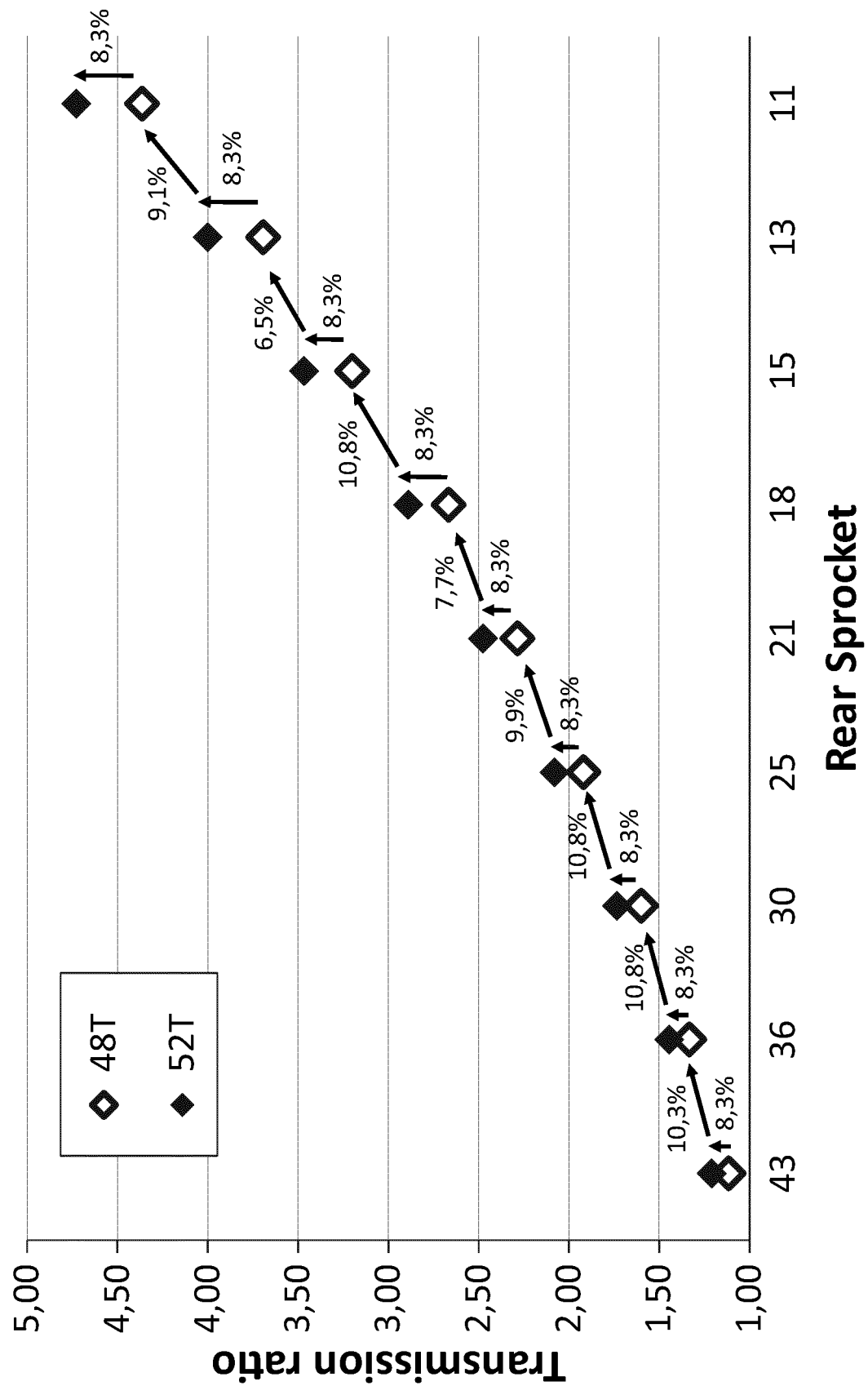
FIG. 2 shows the transmission relations and the strategy for shifting from the "half-step" proposed.

With this configuration it is possible that the second chain-ring 2 has only four teeth more than the first chain-ring 1 and both chain-rings 1-2 having a support part S1, S21, S22, S23, S24, S25, S26 of the teeth sufficient for supporting the forces to be transmitted. And in this way strategies for shifting from the "half-step" like those shown in FIG. 2 can be applied. With two chain-rings having 48 and 52 teeth, and 9 rear sprockets having 11 to 43 teeth, 18 relations are obtained, all useful, that cover the same range than a common transmission like the one shown in FIG. 1 but with steps more uniform comprised between 7.7 and 10.8%. This shifting strategy exhibits a better staggering of the transmission relations and a more simple and clear shift logic.

In the preferred configuration the shift from chain-rings and rear sprockets will have an electronic control wherein a sequential activation thereof is configured for carrying out the shifting strategies "half-step" defined according to the simple orders from the cyclist from a bigger to a lower relation. The control of the shift from chain-rings will also imply a position sensor for controlling that the chain-ring shifts are initiated with the appropriate segment.

The disclosure also relates to a method for the determination, to achieve an ideal shift from the first chain-ring 1 to the second chain-ring 2, of:
  a) The angular position between the first chain-ring 1 and the up-shift segment 21 of the second chain-ring 2; and
  b) The determination of the valley of the second chain-ring 2 wherein the segmentation of the up-shift segment starts 21.

Figure 9:
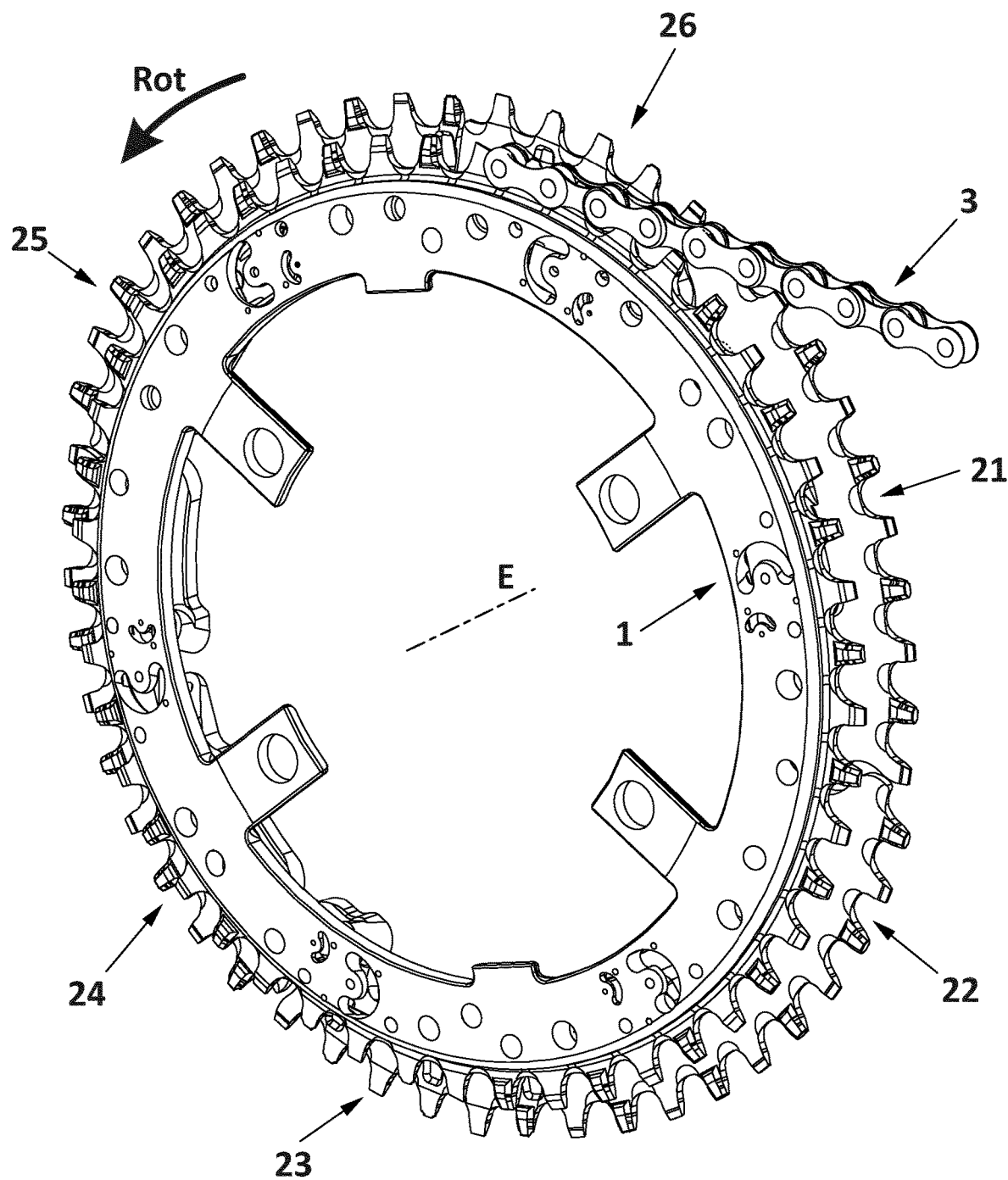
FIG. 9 shows the set composed of a small chain-ring, a big chain-ring and a chain in the configuration wherein the power is transmitted through the small chain-ring.

This method is applied to the chain-rings set 1, 2 of FIG. 9. Specifically, it is applied to a set provided with a chain 3, a first chain-ring 1, a second chain-ring 2 having a common axis E with the first chain-ring 1 and provided with more teeth than the first chain-ring 1.

Figure 14:
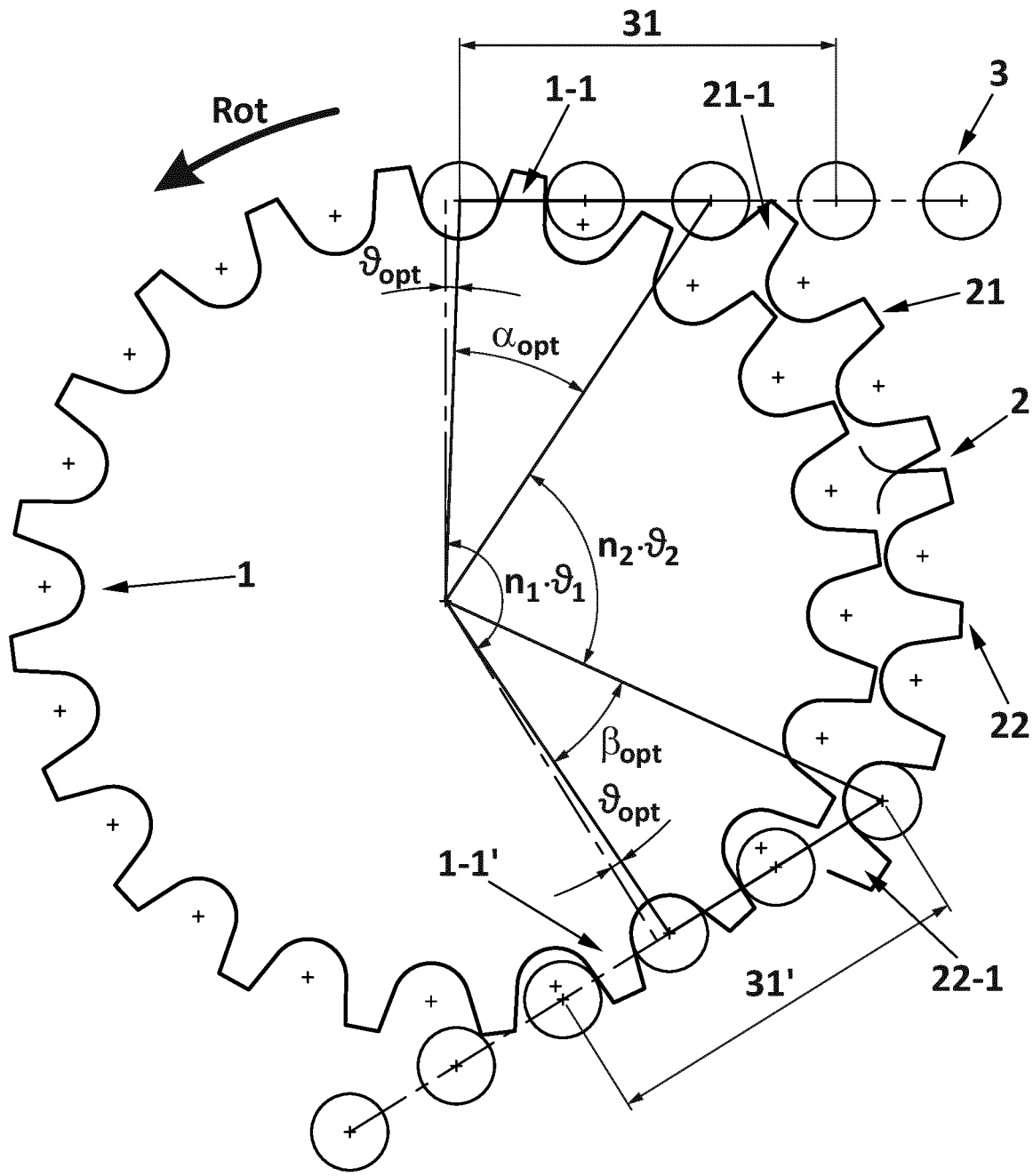
FIG. 14 schematically shows the basic geometric figures for the calculation of the angular displacement between chain-rings for an optimum up-shift and an optimum down-shift.

As shown in FIG. 14, a shifting configuration with tensed chain section 31 is defined, this is the section in which ends are applied simultaneously, at least during a short transition period, a propelling force coming from both chain-rings 1 and 2.

The second chain-ring 2 is formed by independent segments 21, 22, 23, 24, 25, 26, such that each segment is delimited by two segmentation cuts, as depicted in FIG. 8. The method is applied to the set comprising axial displacement means of the segments 21, 22, 23, 24, 25, 26 such that they can be moved in an independent manner at least in the direction of the common axis E A first segment 21, called up-shift segment 21, has a first tooth 21-1 which is the first to be engaged with the chain 3 in the rotation movement Rot, a point of the valley previous to the first tooth 21-1 corresponds to the point wherein the segmentation of the first segment 21 starts.

Figure 13:
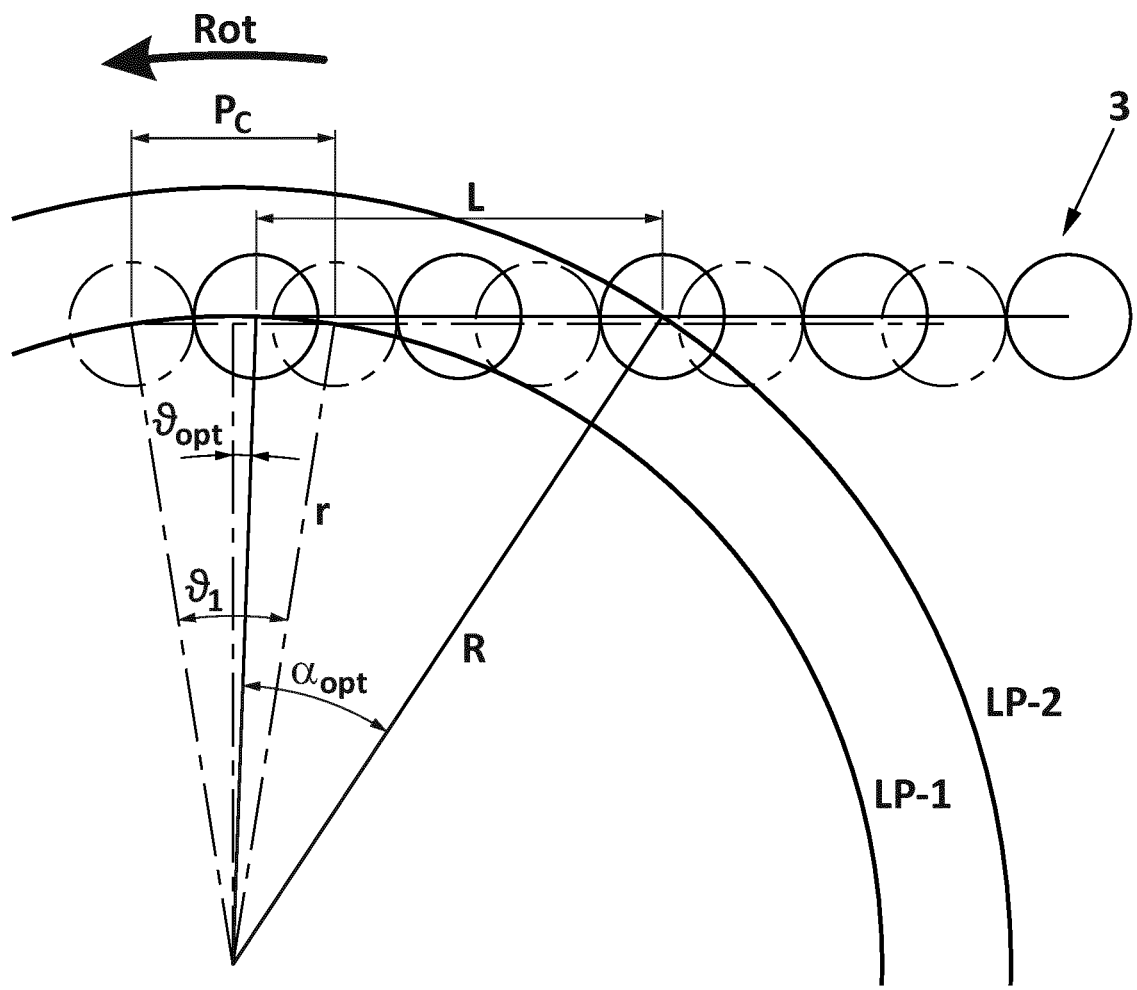
FIG. 13 shows the basic geometric parameters for the calculation of the optimum angular displacement between chain-rings.

Referring to FIGS. 13 and 14, the method comprises:
  a. Determine in the first chain-ring 1 the angle interval boundaries $[-\vartheta_1/2; \vartheta_1/2]$ wherein the force between the first chain-ring 1 and the section 31 of tensed chain 3 is transmitted, the boundary angles of the interval being symmetrical with respect to a reference radius ($\vartheta=0$) which is perpendicular to the section 31 of tensed chain 3, wherein the arc ($\vartheta_1$) subtended by said interval corresponds to the chain pitch $P_c$;
  Where, $$\vartheta_1 = \frac{2 \cdot \pi}{Z_1} \text{ whereas } \vartheta_2 = \frac{2 \cdot \pi}{Z_2},$$

$Z_1$ being the number of teeth of the first chain-ring 1, and $Z_2$ the number of teeth of the second chain-ring 2.
  b. Determine in the angle interval $[-\vartheta_1/2; \vartheta_1/2]$ the angle $\vartheta_{opt}$, called optimum angle for shifting from the first chain-ring 1 to the second chain-ring 2, for which the distance L between:

The first intersection, between the radius corresponding to said optimum angle $\vartheta_{opt}$ and the primitive circle LP-1 of the first chain-ring 1 having radius r; and
The second intersection, between the straight line passing through the first intersection and which is perpendicular to the reference radius ($\vartheta=0$) and the primitive circle LP-2 of the second chain-ring 2 having radius R, Is a multiple of the chain pitch $P_c$, such that an optimum relative angle $\alpha_{opt}$ between the radius passing through the first intersection and a radius passing through the second intersection is defined;
Where $$r = \frac{P_C/2}{\sin(\vartheta_1/2)}, R = \frac{P_C/2}{\sin(\vartheta_2/2)}, \text{ and}$$

$$L = \text{floor}\left(\sqrt{\frac{1}{4 \cdot \sin^2(\vartheta_2/2)} - \frac{1}{4 \cdot \tan^2(\vartheta_1/2)}} + \frac{1}{2}\right) \cdot P_C$$

c. Arranging the first chain-ring 1 and the second chain-ring 2 with a relative angular position wherein:
The lowest point of a valley of the first chain-ring 1 is located in a radius forming an optimum angle $\vartheta_{opt}$ with the reference radius $\vartheta=0$; and
The lowest point of a valley of the second chain-ring 2 previous to the first tooth 21-1, which is the valley wherein the segmentation of the first segment 21 starts, is located in a radius forming an optimum relative angle $\alpha_{opt}$ between valleys with the radius corresponding to the optimum angle ($\vartheta_{opt}$), Such that a simultaneous traction on the tensed chain section 31 exerted by the last tooth 1-1 of the first chain-ring 1 and the first tooth 21-1 of the second chain-ring 2 is obtained.

Therefore, with this method an ideal shift from the first chain-ring 1 to the second chain-ring 2 can be achieved.

The reference radius means the radius taken as origin for measuring the angles.

The concepts of this method can be applied in an equivalent way to the determination of the relative position between a down-shift segment 22 and first chain-ring 1 and of the cut valleys of the segment.

This method comprises:
  a. Determine in the first chain-ring 1 the angle interval $[-\vartheta_1/2; \vartheta_1/2]$ wherein the force between the first chain-ring 1 and the tensed chain section 31' is transmitted, the extreme angles being symmetrical with respect to a reference radius ($\vartheta=0$) which is perpendicular to the tensed chain section 31', wherein the arc subtended by said interval corresponds to the chain pitch $P_c$;
  b. Determine in the angle interval $[-\vartheta_1/2; \vartheta_1/2]$ the angle $\vartheta_{opt}$, called optimum angle for shifting from the second chain-ring 2 to the first chain-ring 1, for which the distance L between:
The intersection, called first intersection, between the radius corresponding to said optimum angle $\vartheta_{opt}$ and the primitive circle of the first chain-ring 1 having radius r; and
The intersection, called second intersection, between the straight line passing through the first intersection and which is perpendicular to the reference radius and the primitive circle of the second chain-ring having radius R, Is a multiple of the chain pitch $P_c$, such that an optimum relative angle $\beta_{opt}$ between the radius passing through the first intersection and a radius passing through the second intersection is defined;

c. Arranging the first chain-ring 1 and the second chain-ring 2 with a relative angular position wherein:

The lowest point of a valley of the first chain-ring 1 is located in a radius forming an optimum angle $\vartheta_{opt}$ with the reference radius ($\vartheta$=0); and The lowest point of a valley of the second chain-ring is located in a radius forming an optimum relative angle $\beta_{opt}$ with the radius corresponding to the optimum angle $\vartheta_{opt}$, such that the chain 3 can seat in both valleys in the moment for shifting from the first chain-ring 1 to the second chain-ring 2, with a simultaneous traction on the tensed chain section 31' exerted by the last tooth 21-1 of the second chain-ring 2 and the first tooth 1-1' of the first chain-ring 1.

It should be pointed out that by a valley, any valley is meant, since it is a rotating structure. Obviously, the chosen valley will determine which is the resulting segmentation.

In a circular chain-ring the distance L for shifting from the second chain-ring 2 to the first chain-ring 1 is the same as the distance L for shifting from the first chain-ring 1 to the second chain-ring 2, and therefore the ideal relative angle between valleys $\beta_{opt}$ equals $\alpha_{opt}$. As shown in FIG. 14, for the relative position between valleys of the two chain-rings 1 and 2 to be $\beta_{opt}$ in a point, and $\alpha_{opt}$ in another point it is necessary that the following relation is met:

$$\alpha_{opt} + \beta_{opt} + n_2 \cdot \vartheta_2 = n_1 \cdot \vartheta_1 \text{ where } n_1 \text{ and } n_2 \text{ are integers.}$$

The probability to meet this relation is minimum, such that in almost all cases a perfect engagement both in up-shift $$= -r \cdot \sin\alpha \cdot \sin\left(\frac{\vartheta_2}{2} + \frac{\gamma}{2}\right) - (R - r \cdot \cos\alpha) \cdot \cos\left(\frac{\vartheta_2}{2} + \frac{\gamma}{2}\right) + \sqrt{\left(r \cdot \sin\alpha \cdot \sin\left(\frac{\vartheta_2}{2} + \frac{\gamma}{2}\right) + (R - r \cdot \cos\alpha) \cdot \cos\left(\frac{\vartheta_2}{2} + \frac{\gamma}{2}\right)\right)^2 - R^2 - r^2 + 2 \cdot R \cdot r \cdot \cos\alpha + L^2}$$

and in down-shift will not be reached and therefore the shift angles $\alpha$ and $\beta$ will have to be different from $\alpha_{opt}$ and $\beta_{opt}$, or at least one of them.

Figure 15:
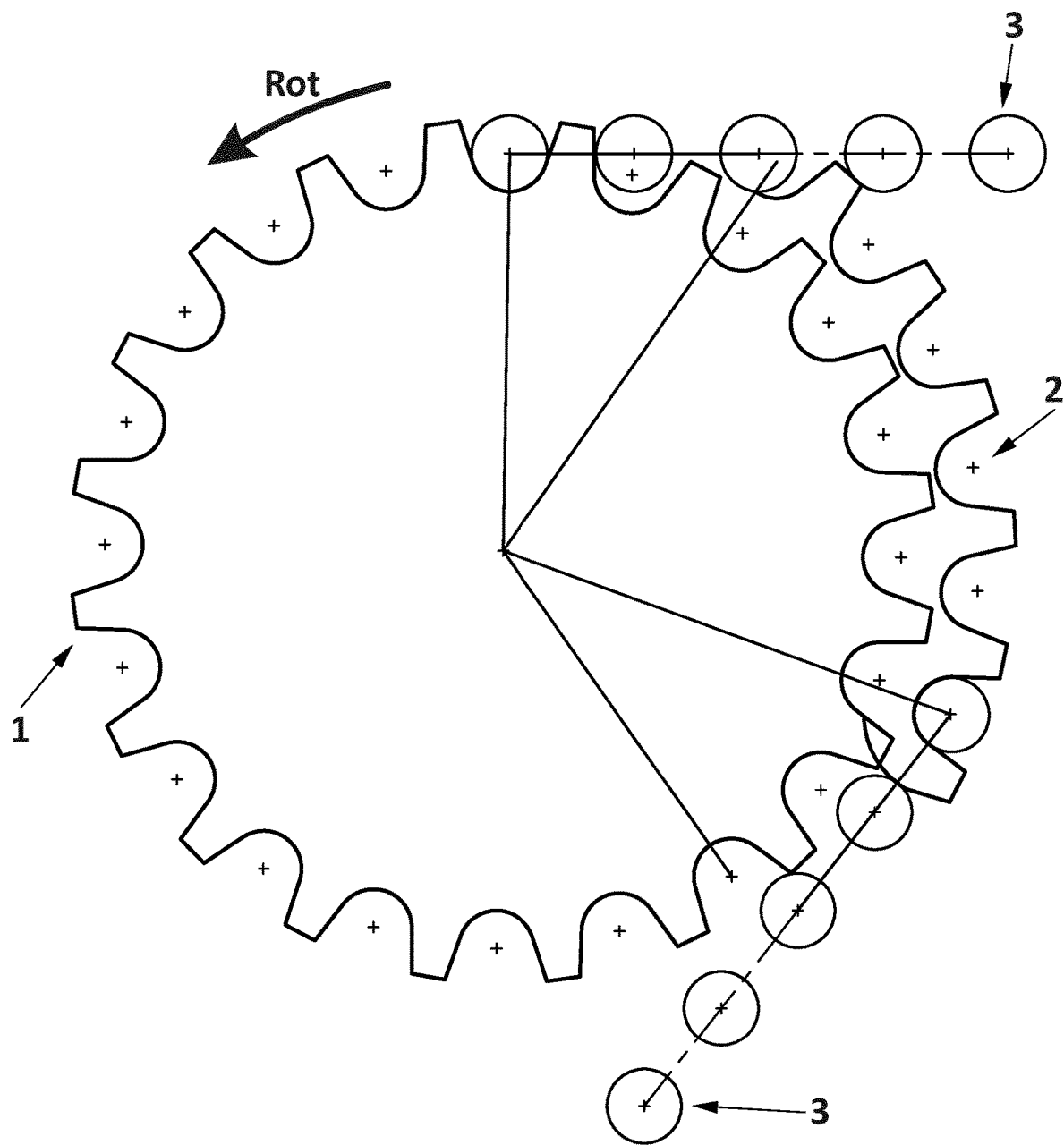
FIG. 15 schematically shows the unwanted situations in an up-shift and in a down-shift.

If $\alpha$ is bigger than $\alpha_{opt}$ the chain 3 is too short in the up-shifting process, such that it can stumble both on the segment end or with the upper part of the tooth, as shown in FIG. 15. and the successive supports will be even worse since they will increasingly stumble on the upper part of the tooth since the pitch between the tips of the tooth is smaller than the pitch of the chain. This process for chain-ring shifting is incorrect. If $\beta$ is bigger than $\beta_{opt}$ the chain 3 is also too short in the process for down shifting, as shown in FIG. 15, thus stumbling on the exterior or upper part of the tooth, with the same incorrect result than in the previous case.

If $\alpha$ is less than $\alpha_{opt}$ the chain 3 is too long such that the engagement roller R3-1 can contact the front flank FF21-1 of the first tooth 21-1 of the segment 20 instead of directly falling in the valley, as shown in FIG. 16. When positioning in a larger diameter the pitch is also bigger and therefore the subsequent rollers will rest increasingly below in the front flank since rapidly falling in the valley. Similarly, as shown in FIG. 16 too, if $\beta$ is less than $\beta_{opt}$ the chain 3 is too long such that the engagement roller R3-1' can contact the front flank FF1-1' of the first tooth 1-1' of the first chain-ring 1 (for this it can be necessary to cut down the tooth of the small chain-ring that lies between) instead of directly falling in the valley. When positioning in a larger diameter the pitch is bigger too and therefore the following rollers will rest increasingly below on the front flank until directly falling in the valley.

As disclosed, the conditions for the optimization of the up-shifts and down-shifts are different, and in general, if the ideal shift reached in one of them, it is not possible in the other one.

Therefore, a compromise must be reached, which is obtained with a method for determining the relative position between chain-rings 1, 2 and for the determination of at least a valley for the start of the segmentation for an up-shift segment 21 and at least a valley for the start of the segmentation for a down-shift segment 22, which comprises:

a. Determining the distance L according to step b) of the up-shift optimization method disclosed above;

b. For each pair of valleys of the first chain-ring 1 and the second chain-ring 2, and as a function of the angular relative position between chain-rings 1, 2, determine the height x with respect to the primitive diameter LP_2 of the second chain-ring 2, of the contact point between the roller and the tooth, and determine if the contact is produced in the previous tooth or in the subsequent, in the case of up-shifting;

$\alpha = \alpha_0 + n_1 \cdot \vartheta_1 + n_2 \cdot \vartheta_2$ where $\alpha_0$ is an initial value (having a lower value than $\vartheta_2$), $n_1$ is an integer between 1 and $Z_1$, and $n_2$ is an integer between 1 and $Z_2$. In such a way for each $\alpha_0$ $Z_1 \times Z_2$ values for a are obtained that will be calculated with the following equation:

c. For each pair of valleys of the first chain-ring 1 and the second chain-ring 2, and as a function of the same relative angular position between chain-rings 1, 2, determine the height and with respect to the primitive diameter LP-1 of the first chain-ring 1, of the contact point between the roller and the tooth, and determine if the contact is produced in the previous tooth or in the subsequent, in the case of down-shifting;

$\beta = \beta_0 + n_1 \cdot \vartheta_1 + n_2 \cdot \vartheta_2$ where $\beta_0 = -\alpha_0$. In such a way for each $\alpha_0$ $Z_1 \times Z_2$ values for $\beta$ are obtained that will be calculated with the following equation:

$$y = -R \cdot \sin\beta \cdot \sin\left(\frac{\vartheta_1}{2} + \frac{\gamma}{2}\right) - (r - R \cdot \cos\beta) \cdot \cos\left(\frac{\vartheta_1}{2} + \frac{\gamma}{2}\right) + \sqrt{\left(R \cdot \sin\beta \cdot \sin\left(\frac{\vartheta_1}{2} + \frac{\gamma}{2}\right) + (r - R \cdot \cos\beta) \cdot \cos\left(\frac{\vartheta_1}{2} + \frac{\gamma}{2}\right)\right)^2 - r^2 - R^2 + 2 \cdot R \cdot r \cdot \cos\beta + L^2}$$

Figure 17:
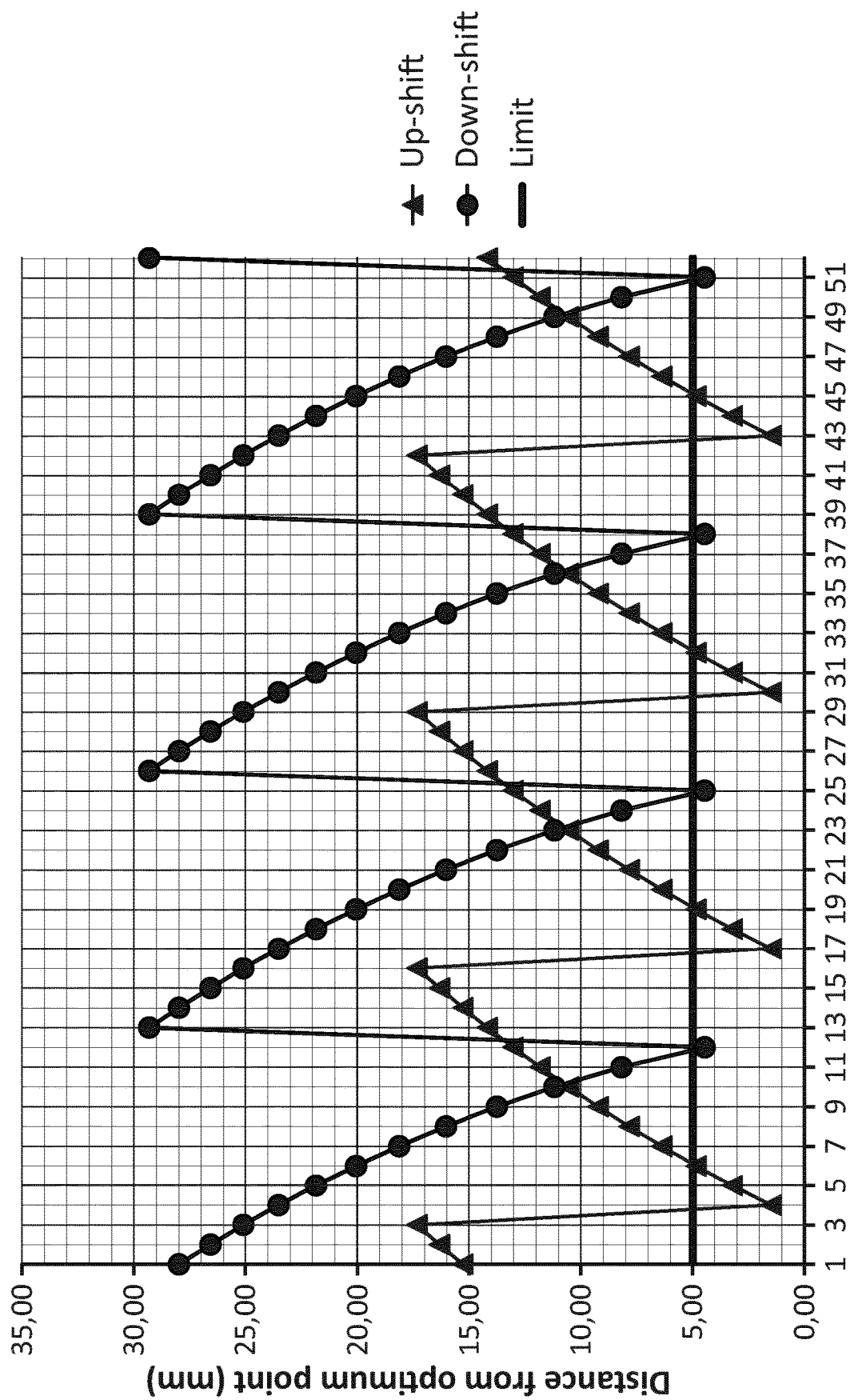
FIG. 17 shows the graphic which represents, for the case of the shift from a small chain-ring to a big chain-ring and big to small, the height of the contact point between roller and front flank as a function of the angle, this latter expressed in teeth, for a 48-52 chain-rings set.

In an example with two chain-rings of 52 and 48 teeth, for each one of the 52 valleys of the big chain-ring are applied the previous equations to define the distances x and y to the 48 valleys of the small chain-ring from each valley of the big chain-ring (2×52×48 values calculated). For a determined valley of the second chain-ring 2, of the 2×48 values calculated most of them will be an error value that will have to be discarded, for choosing the lowest values x and y among the rest of the values. These x and y minimum values for each valley of the big chain-ring are those that are represented in FIG. 17. In this way a graphical representation is obtained, it indicates the suitability of each valley for being a valley wherein a segmentation up-shift and/or down-shift cut can be properly carried out.

d. Establish a maximum acceptable contact height both for the up-shift ($x_{max}$) and the down-shift ($y_{max}$);

e. Segment the second chain-ring (2) in at least a pair of up-shift and down-shift valleys for which the height (x, y) is less than the maximum acceptable contact height ($x_{max}$, $y_{max}$).

For example, in the previous example of FIG. 17 with two chain-rings de 48 and 52 teeth, and establishing a 5 mm maximum contact height, corresponding to the height of the tooth from the centre of the valley, both in up-shift and in down-shift, the initial or final valleys optimum in up-shift and/or down-shift would those lying below the line defined by the maximum contact height, in this case the valleys 4, 5, 6, 17, 18, 19, 30, 31, 32, 43, 44 and 45 are optimal for up-shift, and the cuts 12, 25, 38 and 51 are optimal for the down-shift (the numbering of the valleys increases in the rotation sense Rot). The optimal up-shift cuts would be made in the same initial valleys optimal in up-shift: 4, 5, 6, 17, 18, 19, 30, 31, 32, 43, 44, whereas the optimal down-shift cuts would be made in the previous valley to the optimal final down-shift valleys in the sense of rotation Rot: 11, 24, 37 and 50. From this selection any number of cut points can be selected for optimally segment the second chain-ring 2.

Figure 18:
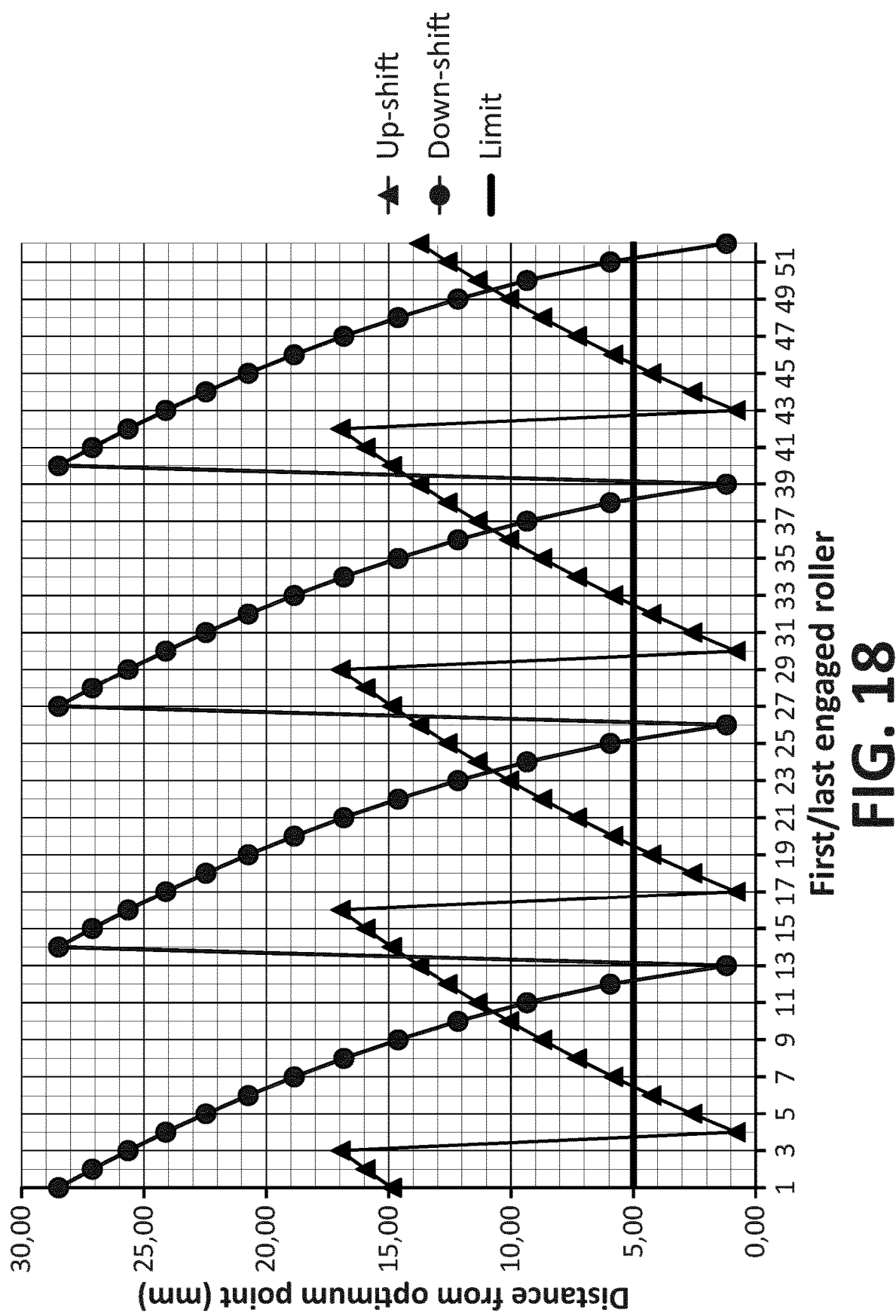
FIG. 18 shows the graphic which represents, for the case of the shift from small chain-ring to a big one and big chain-ring to small one with relative movement between chain-rings for improving the performance, the height of the contact point between roller and front flank as a function of the angle, this latter expressed in teeth, for a 48-52 chain-rings set.

This example shows that the up-shift cuts, are generally better than the down-shift ones, meaning a value ideally closer to 0, than the down-shift one. To balance the behaviour and to obtain a better general behaviour, minimal adjustment can be made in the initial angle $\alpha_0$ (lesser than angle $\vartheta_2$ between valleys of the big chain-ring) to improve the down-shift cuts at the cost of worsening the up-shift ones. After this readjustment the calculation methodology is applied again to obtain the result of FIG. 18 where there are 4 down-shift valleys (13, 26, 39 and 52) as good as the 4 best up-shift valleys (4, 17, 30 and 43). In this way an optimum segmentation of the chain-ring de 52 teeth with 4 segmentation up-shift cuts in the valleys 4, 17, 30 and 43, and 4 segmentation down-shift cuts in the valleys 12, 25, 38 and 51 to obtain 4 combined up-shift and down-shift segments, and other 4 additional intermediate segments could be carried out.

Another aspect to be considered is that in order to keep the synchronism narrow-wide between tooth and the chain 3 with a difference of four teeth (for example FIGS. 9 to 12) it is necessary that the up-shift and the down-shift are carried out approximately a 180° such that in successive up-shifts and down-shifts the difference in the forward travelled distance respect to remain in the chain-ring has to be two teeth so that no synchronism problems show up. In such a way the down-shift cut 25 (last engaged valley 26) is associated to a valley for an up-shift cut 4 (first engaged valley 4), such that we obtain a combined up-shift/down-shift segment with 21 teeth that with 3 up-shift transition teeth and the other 3 for down-shift make that the chain circulates approximately 180° on this segment such that the synchronism narrow-wide is maintained. In a similar way a combined segment between the cuts 30 and 51 can be obtained.

In any case, both segments of 21 teeth are too big for moving them in the chain free zone, therefore they can be divided according to FIG. 8 in both up-shift segments 21-24 having 10 teeth (between the valleys 4 to 14, and 30 to 40) and both down-shift segments 22-25 having 11 teeth (between the valleys 14 to 25, and 40 to 51), and complete them with both additional segments 23-26 having 5 teeth (between the valleys 25 to 30, and from 51 to 4).

Figure 19:
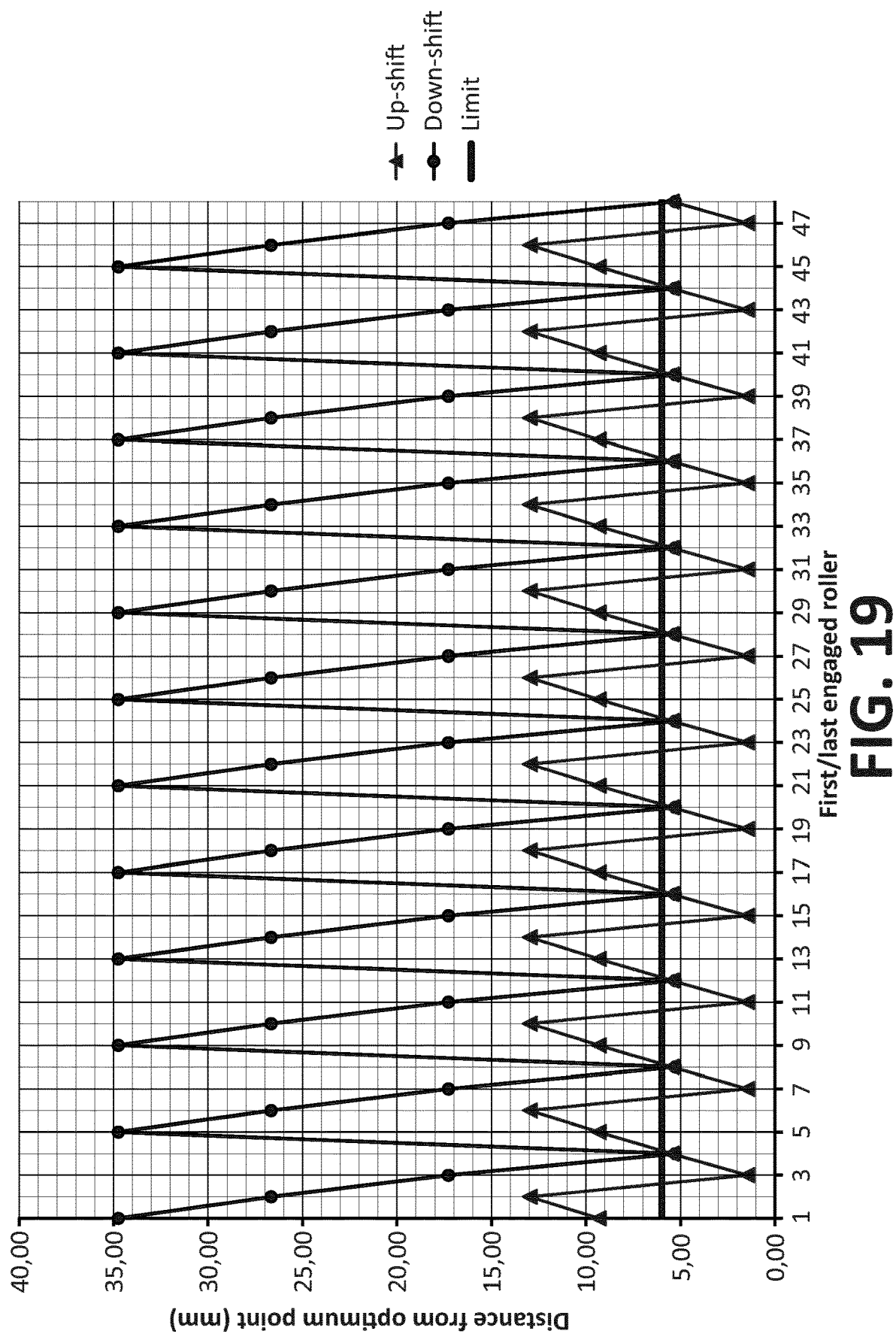
FIG. 19 shows the graphic representing, jointly for the case of the shift from a big chain-ring to a small chain-ring and from a small chain-ring to a big chain-ring, the height of the contact point between roller and front flank as a function of the angle, this latter expressed in teeth, for a chain-rings set 36-48.

The segmentation process can be applied to any other chain-rings 1, 2 set. For example, for a second chain-ring 2 having 48 teeth and a first chain-ring 1 having 36 teeth the suitability segmentation plot of FIG. 19 would be obtained. This result has the particularity that many valleys (3, 7, 11, 15, 19, 23, 27, 31, 35, 39, 43, 47) are optimal both for the up-shift cut and the down-shift cut. Segmenting the chain-ring only in these valleys (for example 3, 15, 27 and 39), as shown in FIG. 20, any shift segment 20 would fit as an up-shift segment and for the down-shift and therefore initiate the up-shifts and down-shifts with a determined segment would be no longer necessary.

To develop this theory, some approaches have been made wherein the pitch of the teeth is the same as the pitch of the chain, the valley between teeth is circular and that the front edge of the teeth is flat. These approaches are not met in most chain-ring teeth used in the prior art, but the differences are small, so the results considering these approaches will be generally valid.

In the case that the chain-rings 1, 2 of the system are not circular with a constant radius, it would be possible to develop a similar formulation based on the polar definition of the chain-rings 1, 2 having variable radius, and apply a similar segmentation method.

Figure 21:
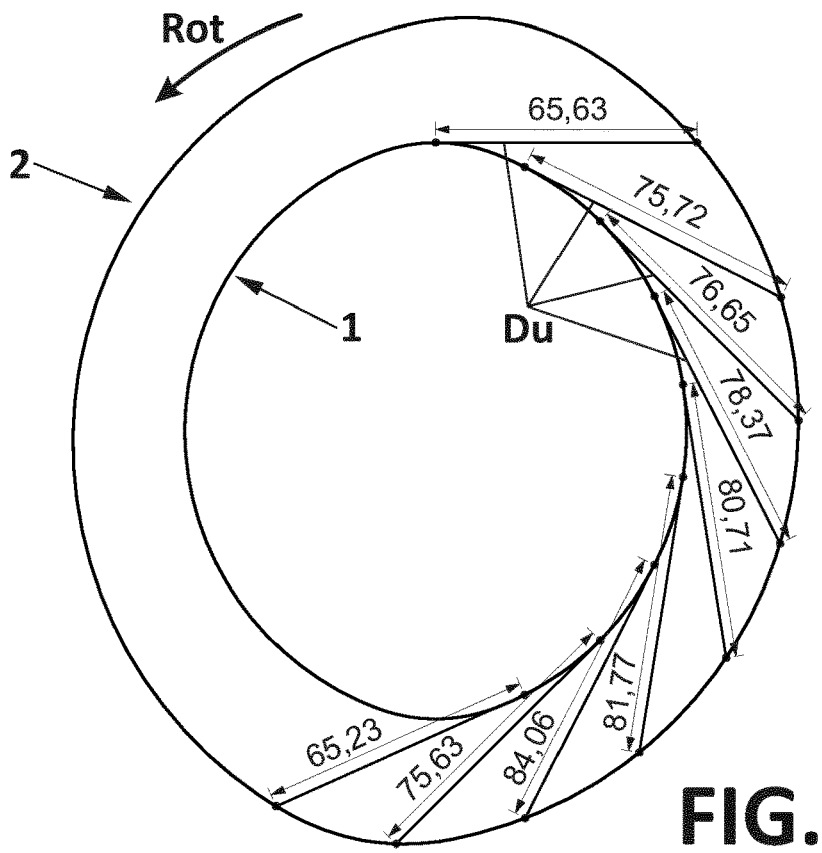
FIGS. 21 to 27 show the steps of a graphic method for determining the cut points of a big chain-ring.
Figure 22:
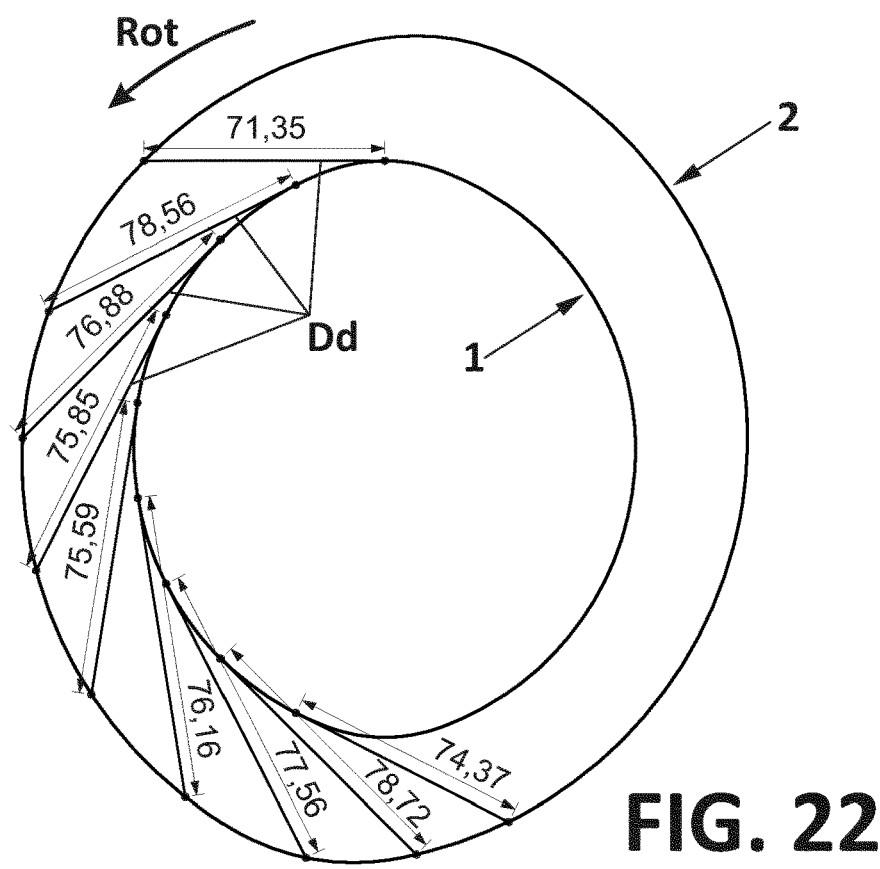
Figure 23:
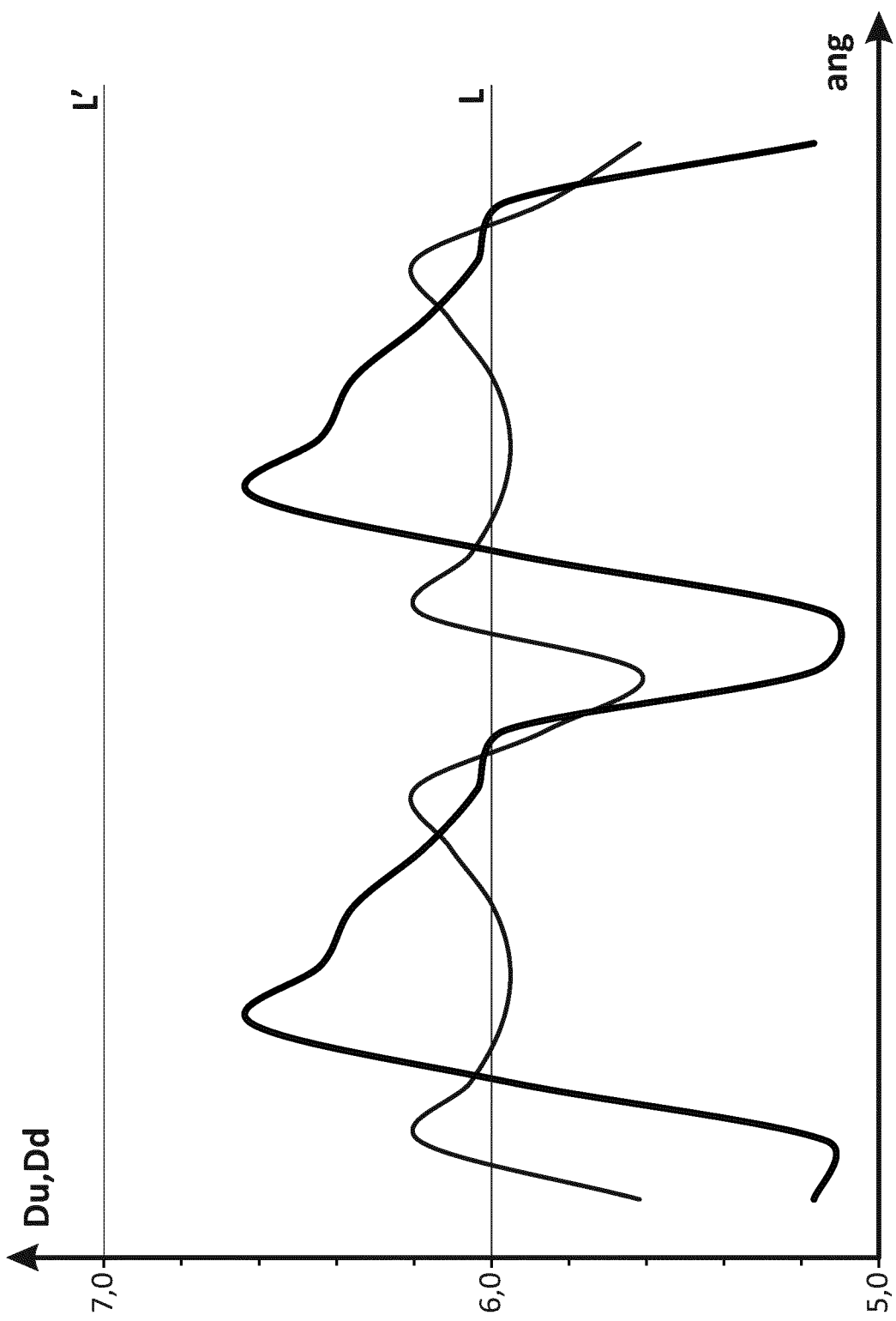

It is also feasible to develop a similar graphical methodology for determining the optimal segmentation both in circular or variable radius chain-rings, for example, the method applied in FIG. 21 to 27 for segmenting an oval chain-ring 2 relative to a smaller oval chain-ring 1 with a different orientation:

1. Measuring the distance Du and Dd from discrete points of the primitive line LP1 of the first chain-ring 1 to the primitive line LP2 of the second chain-ring 2 in the direction tangent to the primitive line LP1 in both directions according to what is shown in FIGS. 21 and 22, and the result is plotted in FIG. 23 by interpolation of the intermediate points between the discrete points.

Figure 24:
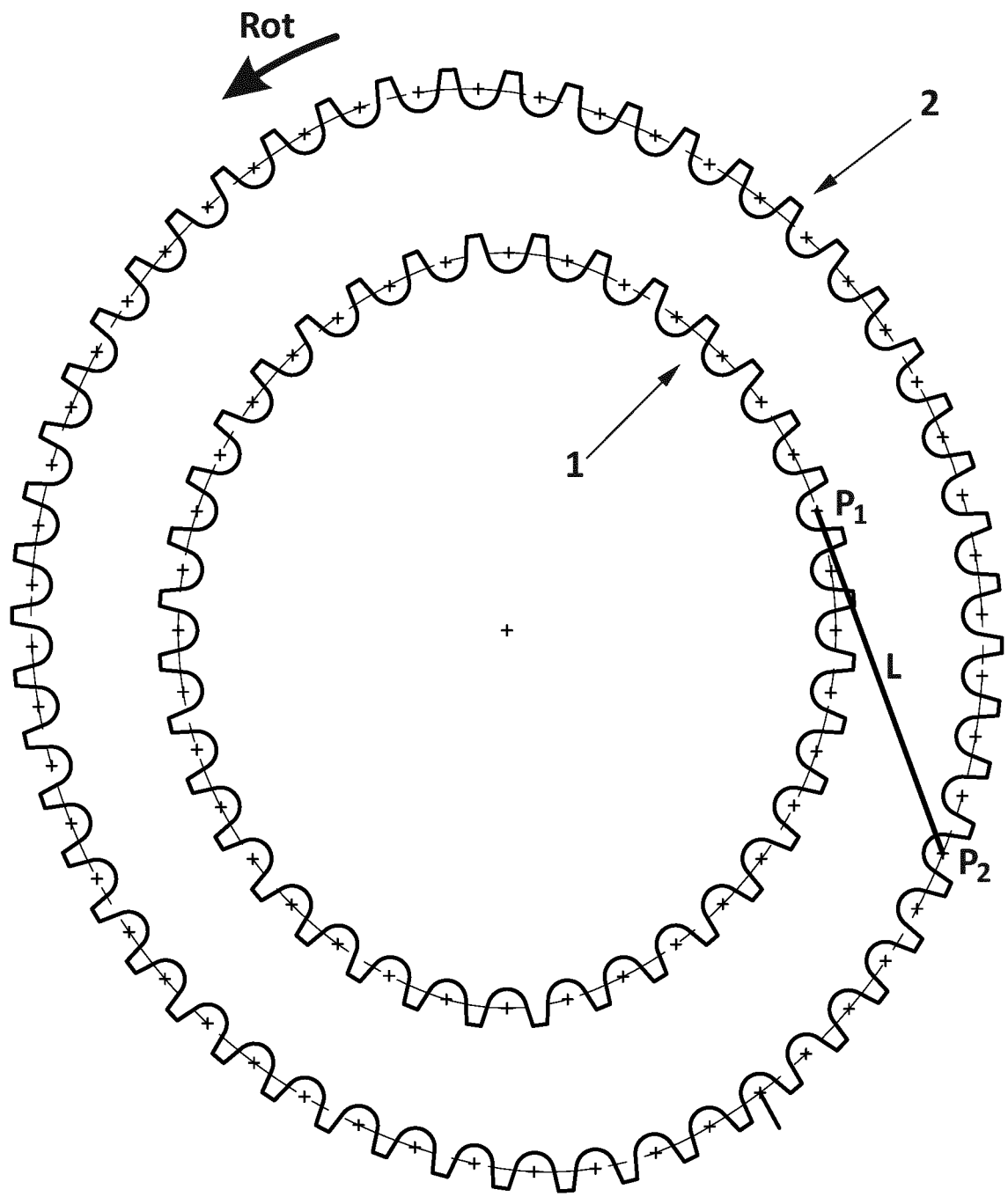

2. A distance L is selected among all the distances plotted that is an integer multiple of the chain pitch $P_c$ (6 in the example of FIG. 23), and this distance is found between the primitive lines by identifying points the P1 and P2 in the primitive lines LP1 and LP2 as shown in FIG. 24. In this way the relative positioning between chain-rings is defined. Taking as a reference the ideal position of the rollers the points P1 and P2, both chain-rings 1, 2 are drawn.

Figure 25:
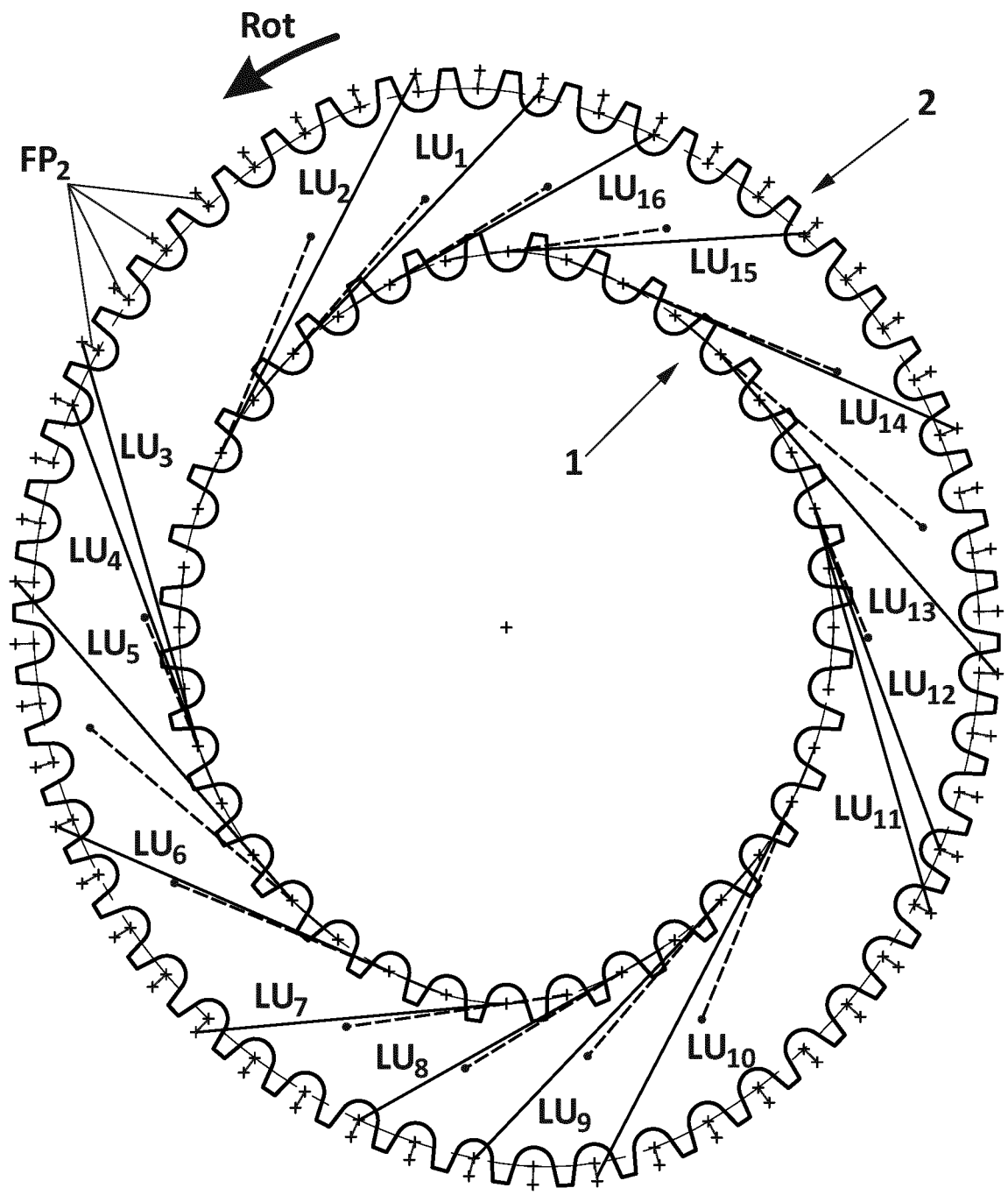

3. For determining the first valleys in the shift a second chain-ring 2, a line or parallel curve FP2 to the front flank of each tooth of the second chain-ring 2 starting from the centre of the previous valley at the height of the primitive line LP2 as shown in FIG. 25.

4. From each valley of the first chain-ring 1, the distance L, L' integer multiple of the pitch of the chain $P_c$ immediately superior to the distance Du plotted in FIG. 23 (6 or 7 in the example) are selected and it is checked if any of the lines or parallel curves FP2 drawn from the centre of the valleys of the second chain-ring 2 can be reached. In case the intersection is found, this line LU is identified as an optimum up-shift line. In FIG. 25 all the optimum up-shift lines LU are shown.

Figure 26:
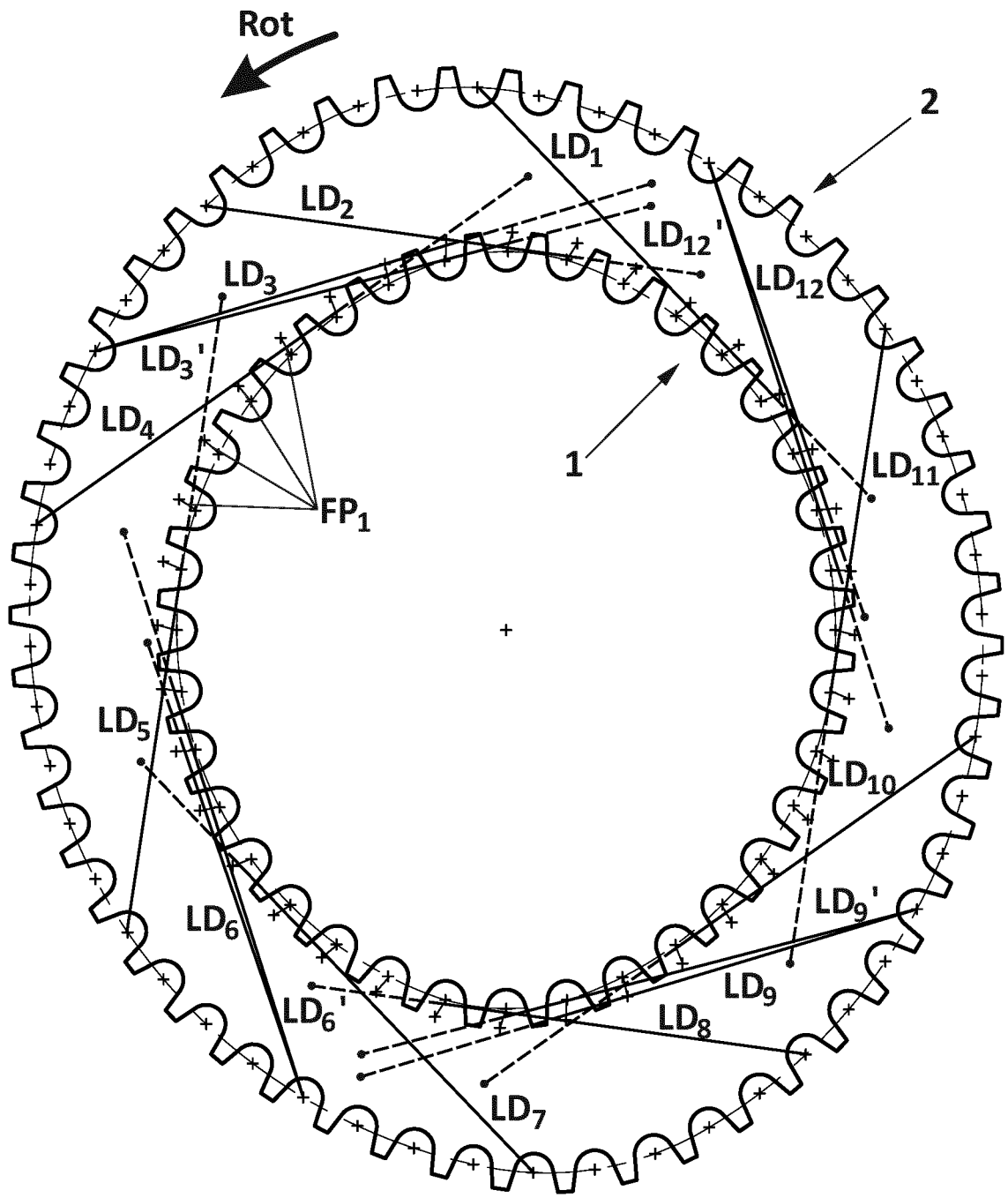

5. For determining the last valleys in the shift a first chain-ring 1, a line or parallel curve FP1 to the front flank of each tooth of the first chain-ring 1 is drawn starting from the centre of the previous valley at the height of the primitive line LP1 as shown in FIG. 26.

6. From each valley of the second chain-ring 2, the distance L, L' integer multiple of the pitch of the chain $P_c$ immediately superior to the distance Dd plotted in FIG. 23 (6 or 7 in the example) are selected and it is checked of any of the lines or parallel curves FP2 drawn from the center of the valleys of the first chain-ring 1 can be reached. In case the intersection with this line LD exists it is identified as an optimum down-shift line. in FIG. 26 all the optimum down-shift lines LD are plotted.

Figure 27:
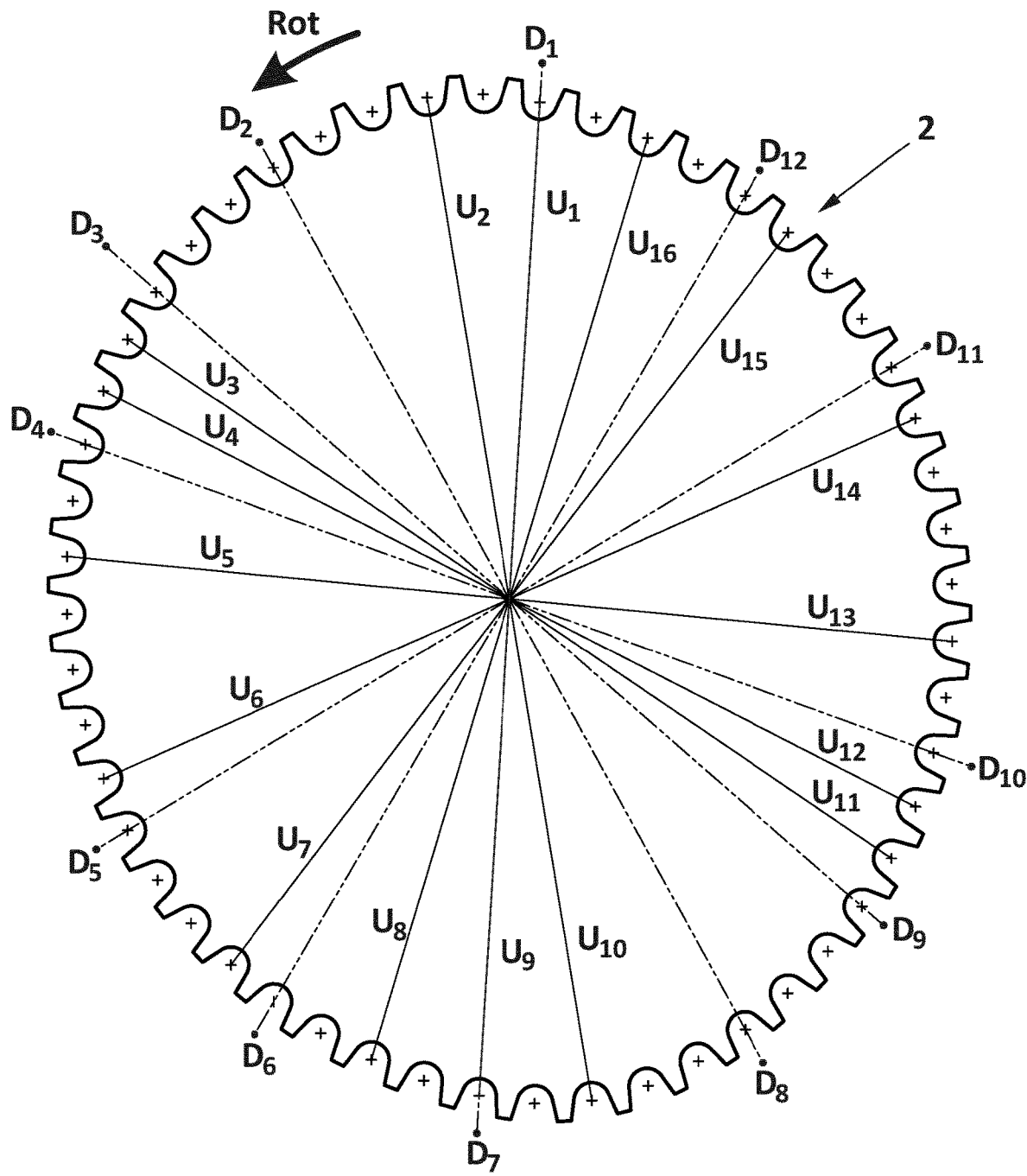

7. The arrival valley of an optimum up-shift line LU defines an up-shift segmentation U, whereas the subsequent valley to the initial valley of an optimum down-shift line LD defines a down-shift segmentation valley D. in FIG. 27 shows all the possible segmentation valleys U, D of the second chain-ring 2.

8. The second chain-ring 2 is segmented using at least an up-shift segmentation valley U and a down-shift segmentation valley D defined in the previous step. FIG. 28 shows a possible solution.

9. It is optional to try to optimize the result by repeating the process steps 2 to 7 after carrying out the relative positioning of the chain-rings based on a distance slightly less than an integer multiple of the pitch. This will generally worsen the shift from the first chain-ring 1 to the second one 2, but it may improve the shift from the second chain-ring 2 to the first one 1.

In the segmentation of FIG. 28 the aim is to have the highest number of possible shift points with the smallest number of segments. To do this, the up-shift cuts coinciding with the down-shift cuts U1-D1 and U9-D7 have been chosen, and then also the cuts U4, D5, D11 U12 that have a very good engagement, for obtaining 6 segments; 4 shifts segments 20 and 2 complementary segments 23, 26.

This system for chain-rings shifting is especially designed for bicycle transmissions. However, it can be applied to a transmission based chains of any other machine on any axis (transmitter or receiver axes). Even in the bicycle, although the advantages of the shifting system are more noticeable in the transmitter shaft (chain-rings shift), the shifting system could be applied in the receiver axis (rear sprockets shift). It is also obvious that the proposed shifting system can operate with more than two chain-rings or rear sprockets wherein a big segmented chain-ring would function as a first non-segmented chain-ring for a segmented chain-ring even bigger. In the present description the application of the disclosure to a two chain-rings set has been described. However, many of the concepts presented here can be generalized to sets of three or more chain-rings. In that case, for example, all the chain-rings except the smallest would be segmented. Then, for example, in a bicycle four chain-rings (44, 49, 54 and 60 teeth) and four rear sprockets (12, 18, 27 and 41 teeth) could be combined using this technology, resulting in 16 relations covering a wider range than a conventional transmission, but with better staggered steps between 10% and 11.4%.

The concepts described can also be applied to other equivalent configurations and different sizes and can be applied to other fields in which a smooth and precise transmission power with multiple relations is needed.

The proposed disclosure corresponds to a system for chain-rings shifting wherein one of the chain-rings is segmented and shifted relative to each other that solves the drawbacks of the patent CH-617992-A5.

Its contribution to the art lies in that the proposed segmentation achieves an optimal synchronization of the chain-rings both in up-shift and in down-shift to minimize the seating phase III, and therefore provides speed, smoothness, accuracy and reliability in the chain-rings shifts.

The proposed disclosure also shows a way to operate segmented shift systems with only four teeth differences between chain-rings with sufficient rigidity and strength, making them applicable to half-step shift strategies.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. Chain-rings set for a power transmission system, the set comprising a chain, a first chain-ring, a second chain-ring having a common axis with the first chain-ring and more teeth than the first chain-ring, the teeth comprising a front flank which is the flank that pushes links of the chain, wherein the second chain-ring is formed by at least two segments, which comprises axial displacement means of the segments such that they can be moved in an independent manner at least in the direction of the common axis, the second chain-ring being segmented in at least:

an up-shift segment for chain shifting from the first chain-ring to the second chain-ring;

a down-shift segment for chain shifting from the second chain-ring to the first chain-ring;

the up-shift segment being angularly arranged with respect to the first chain-ring such that, in a starting configuration for shifting from the first chain-ring to the second chain-ring and in tensed chain conditions in an up-shift section of the chain between both, a last section of chain being tensed between a last tooth of the first chain-ring and a first tooth of the up-shift segment, a front flank for pushing rollers of the chain being defined in the engaged teeth:

a last engaged tooth of the first chain-ring, is engaged in the up-shift section, with an engaged chain-link of the up-shift section, such that the front flank of the last tooth of the first chain-ring contacts an engaged roller of the engaged chain-link of the up-shift section; and a first tooth engaged of the up-shift segment, is engaged in the up-shift section, with an engagement chain-link of the up-shift section, such that the front flank of the first tooth of the up-shift segment contacts an engagement roller of the engagement chain-link of the up-shift section;

the down-shift segment being angularly arranged with respect to the first chain-ring such that, in a starting configuration for shifting from the second chain-ring to the first chain-ring and in tensed chain conditions in a down-shift section of the chain between both, which is the chain section which is tensed between a last tooth of the down-shift segment and a first tooth of the first chain-ring, a front flank for pushing rollers of the chain being defined in the engaged teeth:

a last engaged tooth of the down-shift segment, is engaged in the down-shift section, with an engaged chain-link of the down-shift section, such that a front flank of the last tooth of the down-shift segment contacts an engaged roller of the engaged chain-link of the down-shift section; and a first engagement tooth of the first chain-ring, is engaged in the down-shift section, with an engagement chain-link of the down-shift section, such that a front flank of the first tooth of the first chain-ring contacts an engagement roller of the engagement chain-link of the down-shift section.

2. The chain-rings set according to claim 1, wherein the segments have anterior and posterior segmentation cuts that delimit the segments, wherein a segmentation cut of the down-shift segment prolongs a rear flank of the last tooth of the down-shift segment such that it does not interfere with the roller subsequent to the engaged roller of the down-shift section in the position for shifting from the second chain-ring to the first chain-ring.

3. The chain-rings set according to claim 1, wherein the frontal flanks of the teeth prior to the first tooth of the first chain-ring are cut down above an engagement interval of the flank wherein a force transmission between the chain-ring and the chain is produced in the non-shifting position, so as not to interfere with the rollers of the down-shift section of the chain subsequent in the engagement with the chain-ring to the engaged roller of the engagement section and prior in the engagement with the chain-ring to the engagement roller of the down-shift section in the position for shifting from the second chain-ring to the first chain-ring.

4. The chain-rings set according to claim 1, wherein the last tooth of the down-shift segment and/or a prior tooth of the first chain-ring, in the engagement to the first tooth of the up-shift segment, has a cut-down in the rear flank so as not to interfere with the rollers of the chain in the moment of unseating of the chain from the chain-ring in any shift position.

5. The chain-rings set according to claim 1, which comprises:
one or several additional up-shift segments for chain shifting from the first chain-ring to the second chain-ring, which are configured for the shift like the up-shift segment;
one or several additional up-shift segments for chain shifting from the second chain-ring to the first chain-ring, which are configured for the shift like the down-shift segment.

6. The chain-rings set according to claim 1, which comprises complementary segments for completing the second chain-ring which are not configured for the shift like the up-shift segment neither like the down-shift segment.

7. The chain-rings set according to claim 1, wherein one or several sets of segments started by an up-shift segment or an additional up-shift segment and terminated by a down-shift segment or an additional down-shift segment form a single shift segment with a first tooth and a last tooth, such that they are segments which allow both an optimum shift from the first chain-ring to the second chain-ring and an optimum shift from the second chain-ring to the first chain-ring.

8. The chain-rings set according to claim 1, wherein the first and second chain-rings are circular, oval or variable radius chain-rings.

9. The chain-rings set according to claim 1, wherein the first and second chain-rings have an even number of teeth, in which wide teeth and narrow teeth alternate synchronized with wide and narrow links of the chain.

10. The chain-rings set according to claim 1, wherein the engagement chain-link of the up-shift section which is engaged with the first tooth of the segment or of the segments for chain shifting from the first chain-ring to the second chain-ring is a wide link.

11. The chain-rings set according to claim 1, wherein the first link subsequent in the engagement to the engaged chain-link of the down-shift section wherein the seating area is greater than the 50% of the complete seating area when the engaging roller of the down-shift section contacts the front flank of the first tooth of the first chain-ring in a configuration for shifting from the second chain-ring to the first chain-ring, the so-called centering link, is a wide link.

12. The chain-rings set according to claim 1, wherein each chain-ring or chain-ring segment is formed by a support part of the teeth and a teeth part, wherein the support parts of both chain-rings are always in different planes.

13. Method, in a chain-rings set for a power transmission system comprising a chain, a first chain-ring, a second chain-ring having a common axis with the first chain-ring and provided with more teeth than the first chain-ring, wherein a shifting configuration with tensed chain section is defined, wherein the second chain-ring is formed by independent segments, such that each segment is delimited by two segmentation cuts, which comprises axial displacement means of the segments such that they can be moved in an independent manner at least in the direction of the common axis, wherein an up-shift segment, has a first tooth which is the first which is engaged with the chain in the rotation movement, a point of the valley previous to the first tooth corresponding to the point wherein the segmentation of the up-shift segment starts, for the determination, to achieve an ideal shift from the first chain-ring to the second chain-ring, of the angular position between the first chain-ring and the second chain-ring and the determination of the valley of the second chain-ring wherein the segmentation starts, which comprises the steps consisting of:
a. Determine in the first chain-ring an angle interval $[-\vartheta_1/2; \vartheta_1/2]$ wherein the force between the first chain-ring and the section of tensed chain is transmitted, the extreme angles of this interval being symmetrical with respect to a reference radius ($\vartheta=0$) which is perpendicular to the section of tensed chain, wherein an arc subtended by said interval corresponds to the chain pitch;
b. Determine in the angle interval $[-\vartheta_1/2; \vartheta_1/2]$ an optimum angle for shifting from the first chain-ring to the second chain-ring, for which a distance between:
a first intersection, between the radius corresponding to said optimum angle and a primitive line of the first chain-ring having radius r wherein the center of the roller of the chain must fall and therefore respect thereof the valley of the teeth of the first chain-ring is defined; and
a second intersection, between a straight line passing through the first intersection and which is perpendicular to the reference radius ($\vartheta=0$) and a primitive line of the second chain-ring having radius R, wherein the center of the roller of the chain must fall and therefore respect thereof the valley of the teeth of the second chain-ring is defined, in a rearmost position in the rotation,
is a multiple of the chain pitch, such that an optimum relative angle between a radius passing through the first intersection and a radius passing through the second intersection is defined;
c. Arranging the first chain-ring and the second chain-ring with a relative angular position wherein:

the lowest point of a valley of the first chain-ring is located in a radius forming an optimum angle with the reference radius (ϑ=0); and the lowest point of a valley of the second chain-ring previous to the first tooth, which is the valley wherein the segmentation of the first segment starts, is located in a radius forming an optimum relative angle between valleys with the radius corresponding to the optimum angle, such that the chain can seat in both valleys in the moment for shifting from the first chain-ring to the second chain-ring, with a simultaneous traction on the tensed chain section exerted by the last tooth of the first chain-ring and the first tooth of the second chain-ring.

14. Method, in a chain-rings set for a power transmission system comprising a chain, a first chain-ring, a second chain-ring having a common axis with the first chain-ring and provided with more teeth than the first chain-ring, wherein a shifting configuration with a tensed chain section is defined, wherein the second chain-ring is formed by independent segments, such that each segment is delimited by two segmentation cuts, which comprises axial displacement means of the segments such that they can be moved in an independent manner at least in the direction of the common axis, wherein a down-shift segment has a last tooth, which is the last tooth engaging with the chain in the rotation movement, a subsequent valley to the last tooth corresponding to the valley wherein the segmentation of the down-shift segment terminates, for the determination, to achieve an ideal shift from the second chain-ring to the first chain-ring, of the angular position between the first chain-ring and the second chain-ring and the determination of the subsequent valley to the last tooth of the second chain- ring wherein the segmentation is carried out, which comprises the steps consisting of:

a. Determine in the first chain-ring an angle interval $[-\vartheta_1/2; \vartheta_1/2]$ wherein the force between the first chain-ring and the tensed chain section is transmitted, the extreme angles of this interval being symmetrical with respect to a reference radius (ϑ=0) which is perpendicular to the tensed chain section, wherein an arc subtended by said interval corresponds to the chain pitch;

b. Determine in the angle interval $[-\vartheta_1/2; \vartheta_1/2]$ an optimum angle for shifting from the second chain-ring to the first chain-ring, for which a distance between:
  a first intersection, between a radius corresponding to said optimum angle and a primitive line of the first chain-ring having radius r; and
  a second intersection, between a straight line passing through the first intersection and which is perpendicular to a reference radius and a primitive line of the second chain-ring having radius R in a more advanced position in the rotation, is a multiple of the chain pitch, such that an optimum relative angle between the radius passing through the first intersection and a radius passing through the second intersection is defined;

c. Arranging the first chain-ring and the second chain-ring with a relative angular position wherein:
  the lowest point of a valley of the first chain-ring is located in a radius forming an optimum angle with the reference radius (ϑ=0); and
  the lowest point of a valley of the second chain-ring is located in a radius forming an optimum relative angle with the radius corresponding to the optimum angle, such that the chain can seat in both valleys in the moment for shifting from the second chain-ring to the first chain-ring and such that a simultaneous traction on the tensed chain section exerted by a last tooth of the second chain-ring and a first tooth of the first chain-ring is obtained.

15. Method for determining, in a chain-rings set for a power transmission system, of relative position between chain-rings and for determination of at least a valley for start of segmentation for an up-shift segment and at least a valley for start of segmentation for a down-shift segment, which comprises the steps consisting of:

a. Determine a distance according to step b) of the method according to claims 13;

b. For each pair of valleys of a first chain-ring and a second chain-ring, and as a function of an angular relative position between chain-rings, determine if a contact between an engagement roller of an up-shift section and a first tooth of the up-shift segment is produced in a front flank or in an upper part of the tooth, and determine in the first case a height with respect to a primitive line of the second chain-ring, of an engaging point between the engagement roller of the up-shift section and the first tooth of the up-shift segment;

c. For each pair of valleys of the first chain-ring and the second chain-ring, and as a function of the angular relative position between chain-rings, determine if the contact between an engagement roller of a down-shift section and the first tooth of the first chain-ring is produced in the front flank or in an upper part of the tooth, and determine in the first case a height with respect to a primitive line of the first chain-ring, of an engaging point between the engagement roller of the down-shift section and the first tooth of the first chain-ring;

d. Establish a maximum acceptable contact height both for an up-shift and a down-shift;

e. Segment the second chain-ring in at least a pair of up-shift and down-shift valleys for which the height is less than a maximum acceptable contact height;

wherein the chain-rings set comprises a chain, the first chain-ring, the second chain-ring having a common axis with the first chain-ring and more teeth than the first chain-ring, the teeth comprising the front flank which is a flank that pushes links of the chain, wherein the second chain-ring is formed by at least two segments, which comprises axial displacement means of the segments such that they can be moved in an independent manner at least in the direction of the common axis, the second chain-ring being segmented in at least:

the up-shift segment for chain shifting from the first chain-ring to the second chain-ring;

the down-shift segment for chain shifting from the second chain-ring to the first chain-ring;

the up-shift segment being angularly arranged with respect to the first chain-ring such that, in a starting configuration for shifting from the first chain-ring to the second chain-ring and in tensed chain conditions in the up-shift section of the chain between both, the last section of chain being tensed between a last tooth of the first chain-ring and a first tooth of the up-shift segment, a front flank for pushing rollers of the chain being defined in the engaged teeth:

a last engaged tooth of the first chain-ring, is engaged in the up-shift section, with an engaged chain-link of the up-shift section, such that the front flank of the last tooth of the first chain-ring contacts an engaged roller of the engaged chain-link of the up-shift section; and the first tooth engaged of the up-shift segment, is engaged in the up-shift section, with an engagement chain-link of the up-shift section, such that the front flank of the first tooth of the up-shift segment contacts an engagement roller of the engagement chain-link of the up-shift section;

the down-shift segment being angularly arranged with respect to the first chain-ring such that, in a starting configuration for shifting from the second chain-ring to the first chain-ring and in tensed chain conditions in a down-shift section of the chain between both, which is the chain section which is tensed between a last tooth of the down-shift segment and a first tooth of the first chain-ring, a front flank for pushing rollers of the chain being defined in the engaged teeth:

a last engaged tooth of the down-shift segment, is engaged in the down-shift section, with an engaged chain-link of the down-shift section, such that a front flank of the last tooth of the down-shift segment contacts an engaged roller of the engaged chain-link of the down-shift section; and the first engagement tooth of the first chain-ring, is engaged in the down-shift section, with an engagement chain-link of the down-shift section, such that a front flank of the first tooth of the first chain-ring contacts an engagement roller of the engagement chain-link of the down-shift section.

16. Bicycle comprising a chain-rings set, the set comprising a chain, a first chain-ring, a second chain-ring having a common axis with the first chain-ring and more teeth than the first chain-ring, the teeth comprising a front flank which is the flank that pushes links of the chain, wherein the second chain-ring is formed by at least two segments, which comprises axial displacement means of the segments such that they can be moved in an independent manner at least in the direction of the common axis, the second chain-ring being segmented in at least:

an up-shift segment for chain shifting from the first chain-ring to the second chain-ring;

a down-shift segment for chain shifting from the second chain-ring to the first chain-ring;

the up-shift segment being angularly arranged with respect to the first chain-ring such that, in a starting configuration for shifting from the first chain-ring to the second chain-ring and in tensed chain conditions in an up-shift section of the chain between both, a last section of chain being tensed between a last tooth of the first chain-ring and a first tooth of the up-shift segment, a front flank for pushing rollers of the chain being defined in the engaged teeth:

a last engaged tooth of the first chain-ring, is engaged in the up-shift section, with an engaged chain-link of the up-shift section, such that the front flank of the last tooth of the first chain-ring contacts an engaged roller of the engaged chain-link of the up-shift section; and a first tooth engaged of the up-shift segment, is engaged in the up-shift section, with an engagement chain-link of the up-shift section, such that the front flank of the first tooth of the up-shift segment contacts an engagement roller of the engagement chain-link of the up-shift section;

the down-shift segment being angularly arranged with respect to the first chain-ring such that, in a starting configuration for shifting from the second chain-ring to the first chain-ring and in tensed chain conditions in a down-shift section of the chain between both, which is the chain section which is tensed between a last tooth of the down-shift segment and a first tooth of the first chain-ring, a front flank for pushing rollers of the chain being defined in the engaged teeth:

a last engaged tooth of the down-shift segment, is engaged in the down-shift section, with an engaged chain-link of the down-shift section, such that a front flank of the last tooth of the down-shift segment contacts an engaged roller of the engaged chain-link of the down-shift section; and a first engagement tooth of the first chain-ring, is engaged in the down-shift section, with an engagement chain-link of the down-shift section, such that a front flank of the first tooth of the first chain-ring contacts an engagement roller of the engagement chain-link of the down-shift section.

* * * * *